US012447101B2

(12) United States Patent
Dickinson

(10) Patent No.: US 12,447,101 B2
(45) Date of Patent: Oct. 21, 2025

(54) BIDET AND DISPENSER FOR USE IN TUB OR SHOWER

(71) Applicant: Bryce A Dickinson, Warrenton, VA (US)

(72) Inventor: Bryce A Dickinson, Warrenton, VA (US)

( * ) Notice: Subject to any disclaimer, the term of this patent is extended or adjusted under 35 U.S.C. 154(b) by 183 days.

(21) Appl. No.: 18/492,094

(22) Filed: Oct. 23, 2023

(65) Prior Publication Data

US 2024/0050310 A1 Feb. 15, 2024

Related U.S. Application Data

(63) Continuation-in-part of application No. 17/445,276, filed on Aug. 17, 2021, now Pat. No. 11,795,676, which is a continuation-in-part of application No. 16/392,600, filed on Apr. 23, 2019, now Pat. No. 11,089,909.

(60) Provisional application No. 62/661,151, filed on Apr. 23, 2018.

(51) Int. Cl.
*A47K 3/28* (2006.01)
*A61H 35/00* (2006.01)

(52) U.S. Cl.
CPC ............. *A61H 35/00* (2013.01); *A47K 3/282* (2013.01)

(58) Field of Classification Search
CPC .................... A47K 1/02; A47K 13/302; A47K 2201/00–025; A47K 3/07; A47K 3/122; A47K 3/26; A47K 3/281–282; E03D 9/08–085
See application file for complete search history.

(56) References Cited

U.S. PATENT DOCUMENTS

| | | | | | |
|---|---|---|---|---|---|
| 587,767 | A * | 8/1897 | Stoll | A61M 3/0225 | 604/182 |
| 3,034,137 | A * | 5/1962 | Glou | E03D 11/025 | 604/289 |
| 3,040,335 | A * | 6/1962 | Gellmann | A47K 3/122 | 4/570 |
| 4,123,808 | A * | 11/1978 | Guarrera | A47K 3/03 | 4/447 |
| 2004/0070238 | A1* | 4/2004 | Moser | A47K 11/12 | 297/183.9 |
| 2010/0275365 | A1* | 11/2010 | Fainberg | A47K 3/122 | 4/578.1 |

* cited by examiner

*Primary Examiner* — David P Angwin
*Assistant Examiner* — Nicholas A Ros
(74) *Attorney, Agent, or Firm* — Kimberly O Snead

(57) ABSTRACT

A bidet chair, having legs and a seat, for use in cleaning the body is disclosed. The seat has a spray port extending from the top side to the underside dimensioned to receive the face of a showerhead. Preferably a screen, extending completely or partially across the spray port prevents the showerhead from extending past the seat. A showerhead retaining member places the showerhead under the seat, positioning the face to expel water out the spray port. Preferably the seat also contains drain holes for water drainage during use. The showerhead retaining member can be a showerhead tray having a showerhead receiving area and support system to enable vertical movement of the showerhead tray. In another embodiment the showerhead retaining area can be a pair of rails to hold a retaining element containing the showerhead.

16 Claims, 22 Drawing Sheets

BIDET AND DISPENSER FOR USE IN TUB OR SHOWER

FIELD OF THE INVENTION

The invention relates to a seat containing a spray port positioned to clean a user's genital and anal area upon connection of a shower head.

BACKGROUND OF THE PRIOR ART

Most modern bidets are being added to toilets and, as well as being easy to install, save space within the bathroom. In many cultures bidets are common in every bathroom and in some countries, such as Italy, they have been mandatory since 1975.

Bidets are becoming increasingly popular with the aging community among people with physical disabilities. These combined toilet units make independent toileting possible for many people, affording greater overall independence. These units are often specialized with higher toilet seats allowing easier wheelchair transfer and with some form of electronic remote control that benefits an individual with limited mobility or requiring assistance.

A bidet shower is a hand-held triggered nozzle, similar to that on a kitchen sink sprayer, that is placed in close proximity to the toilet. In contrast to a bidet that is integrated with the toilet, a bidet shower has to be held by the hands, and cleaning does not take place automatically. If care is not taken, it is easy to get water on the user's clothing.

With the increased use of bidets, the focus remains on the standard usage of cleansing after urination or defecation. The cleaning of the perineum area remains unaddressed, especially for the elderly, handicapped, and infirm.

SUMMARY OF THE INVENTION

A bidet chair, having legs and a seat, for use in cleaning the body is disclosed. The seat has a spray port extending from the top side to the underside dimensioned to receive the face of a showerhead. Preferably a screen, extending completely or partially across the spray port prevents the showerhead from extending past the seat. A showerhead retaining member places the showerhead under the seat, positioning the face to expel water out the spray port. Preferably the seat also contains drain holes for water drainage during use. A a cover, having an opening above the spray inlet and openings above the drain holes, can be used to provide user comfort.

The showerhead retaining member can be a showerhead tray having a showerhead receiving area and support system to enable vertical movement of the showerhead tray. The showerhead receiving area can be a depressed portion or alcove to maintain alignment of the showerhead face and the spray port.

In one embodiment the showerhead tray has support bar receiving areas. The support system contains multiple support bars having a length of about eight to about 11 inches, each having a first end secured to the seat and that extend through the support bar receiving areas within the showerhead tray. A compression spring is mounted on each of the multiple support bars between the showerhead tray and a stop placed at the second end. A compression spring is placed between the stop and the showerhead tray. When downward pressure is placed on the showerhead tray the pressure moves the showerhead tray toward the stop and release of the pressure moves the showerhead tray proximate the underside of the seat until resistance is met. The pounds of force per inch of each spring will maintain the showerhead adjacent to the spray port while the showerhead is under pressure from water. A notch within the seat, along a side, enables access to the shower tray and provides an exit for the showerhead hose.

In another embodiment the showerhead retaining member is a showerhead tray having a showerhead receiving area a support system to enable vertical movement of the showerhead tray. The support system comprising multiple outer tubes affixed to the underside of the seat at a first end. Tension springs are placed within each of the multiple outer tubes and preferably secured to the underside of the seat. Inner tubes, dimensioned to fit within the outer tubes and contacting the springs are secured to a base plate. Connectors are placed between the base plate and the seat. Downward pressure on the showerhead tray moves the outer tube to compress the tension springs and release of the pressure moves the showerhead tray proximate the underside of the seat.

The showerhead receiving area can alternatively be a pair of rails and a showerhead support element. The showerhead support element is configured to receive a showerhead and slide between the two rails to position the showerhead under the spray port. A handle support supports the showerhead handle and maintains alignment The bidet chair can further include a soap dispensing system having a pump jar removably affixed to the side of the chair and tubing extending from the pump jar under the seat to a soap dispensing element opening into the spray inlet. Pressing the pump forces soap to travel along the tubing and exit the dispensing element.

BRIEF DESCRIPTION OF THE DRAWINGS

These and other objects, features, advantages, and aspects of the present invention can be better understood with reference to the following detailed description of the preferred embodiments when read in conjunction with the appended drawing figures.

DETAILED DESCRIPTION OF THE INVENTION

Definitions

As used herein the term "bidet chair" shall refer to a chair, generally backless, that is placed within a tub or shower and, in conjunction with the showerhead, is used to clean the perineum area.

As used herein the term "perineum" shall refer to "the pelvic floor and associated structures occupying the pelvic outlet, bounded anteriorly by the pubic symphysis, laterally by the ischial tuberosities, and posteriorly by the coccyx." *Dorland's Medical Dictionary for Health Consumers.* © 2007 by Saunders, an imprint of Elsevier, Inc.

As used herein the term "about" shall refer to a differential of plus or minus 15 percent (15%).

The disclosed bidet chair 100 is designed for use in a shower or tub to enable the user to directly contact the perineum area with sprayed water and, in some embodiments, soap. Unlike the additions to toilets to produce a bidet, the disclosed system is low cost, provides temperature and water pressure control, and is intended to be incorporated into daily showers or baths.

One of the many advantages to the disclosed seated bidet chair is to enable the elderly and/or infirm to maintain autonomy longer. The user can remain seated and wash all portions of their body without the bending required to wash while standing. The shower head is easy to insert and remove and can easily be inserted or removed while seated.

One of the objects of the disclosed bidet chair is to accommodate various sized showerheads. Although kits can be sold that include a showerhead and longer hose, many people have showerheads that they prefer to use. The embodiment of FIGS. 6-12 incorporates the use of rails to carry the showerhead and is optimal to be used as part of a kit that includes the showerhead. Two of the embodiments, covered in FIGS. 1-5 and 19-22 are designed to accept different sized showerheads.

Whether the figure illustrates the showerhead receiving tray, rails, or spring system, the accessories such as the covering pad, soap dispensing system, or pressure adjustable showerhead can be incorporated.

Figure 1:
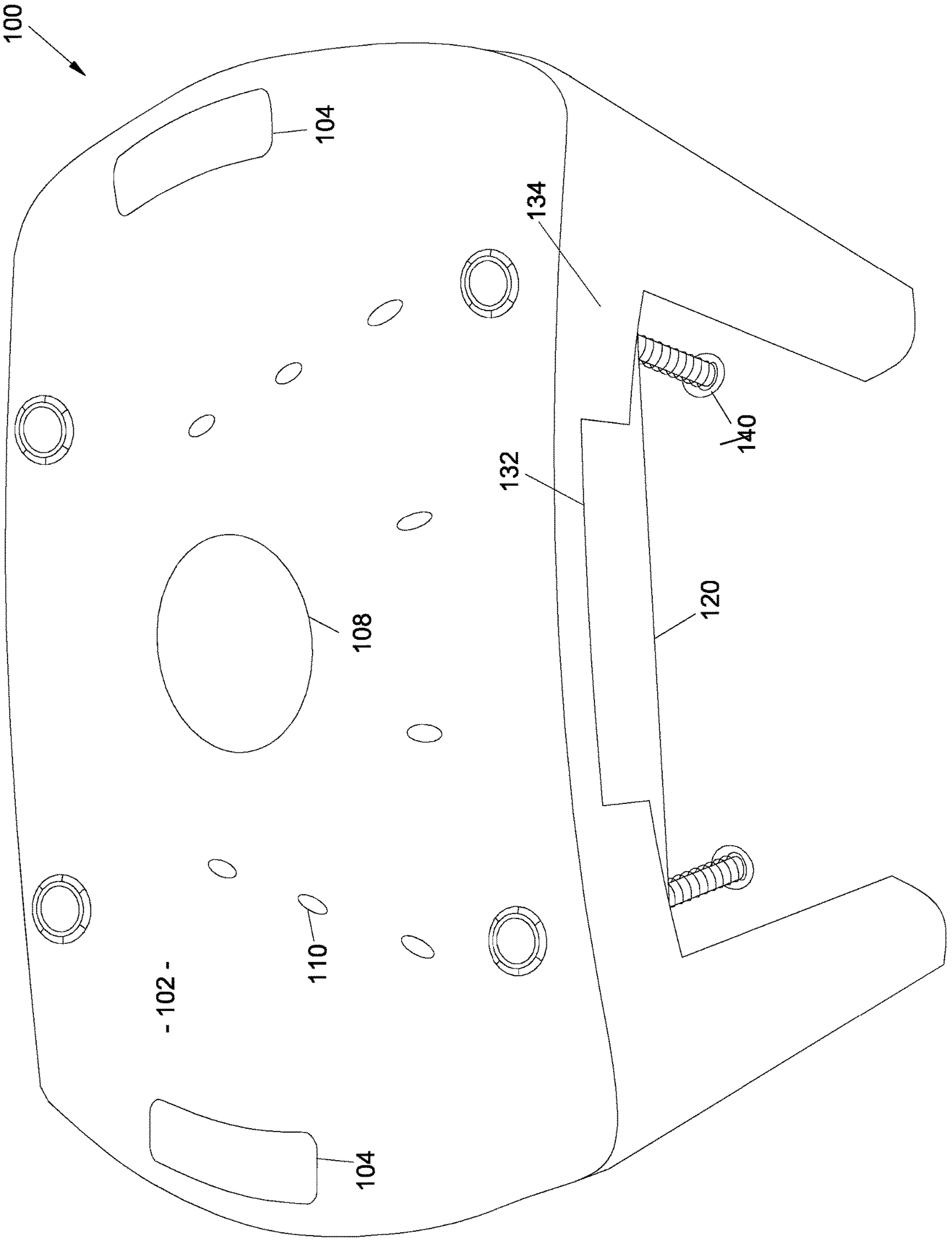
FIG. 1 is a perspective view of the shower bidet chair with the showerhead tray in the compressed position, in accordance with the invention.
Figure 2:
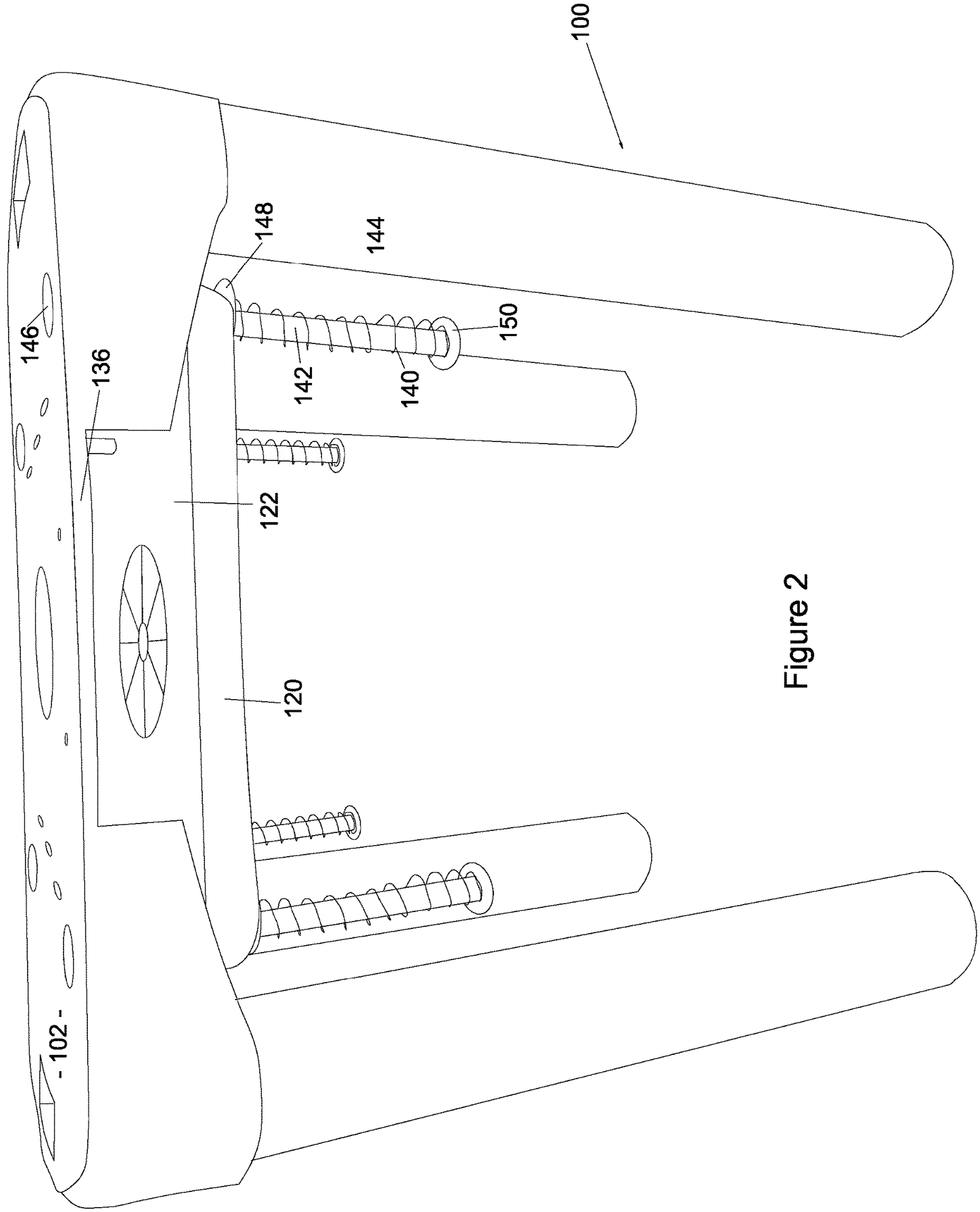
FIG. 2 is a front view of the shower bidet with the showerhead tray in the compressed position, in accordance with the invention.

The disclosed bidet chair 100 as illustrated in FIGS. 1 and 2 is a bench type seat with the seat 102 having perforations 110 for water drainage. The perforations 110 are shown as ovals, however any drain hole shape can be used. Although the drain holes 110 are optional and not necessary for the functioning of the seat 100, they are advantageous to prevent water build up while in use and facilitate drying after use. The bidet chair 100 as illustrated has cutout handles 104, however any handle design convenient for manufacture can be used, including adjustable handles as disclosed hereinafter.

As illustrated in this figure, the spray port 108 is formed in approximately the center of the seat 102 and is illustrated as circular and dimensioned to match that of shower head (not illustrated). The spray port 108 in FIG. 1 shows the shower head tray 120 under the seat 102 into which the shower head fits. It is preferable that the spray port 108 be beveled or molded with a smooth outer surface, be fitted with a gasket, or used with a pad as disclosed hereinafter in order to provide comfort for the user. If a gasket or guard is used, it must fit securely around the spray port 108 and be designed to alleviate any pinching or scraping of the skin. It is preferable that the guard or pad be removable for cleaning and to prevent mold although it can be permanently secured if made from a mold resistant material.

Materials of manufacture will be known to those skilled in the art.

The addition of a non-slip waterproof coating surrounding the spray port 108, and possibly the entire seat 102, is beneficial to ensure a smooth surface, however the coating should be such that water retention is prevented to prevent mold. The use of a coating and its type will be dependent upon the material of manufacture and known to those skilled in the art.

Figure 5:
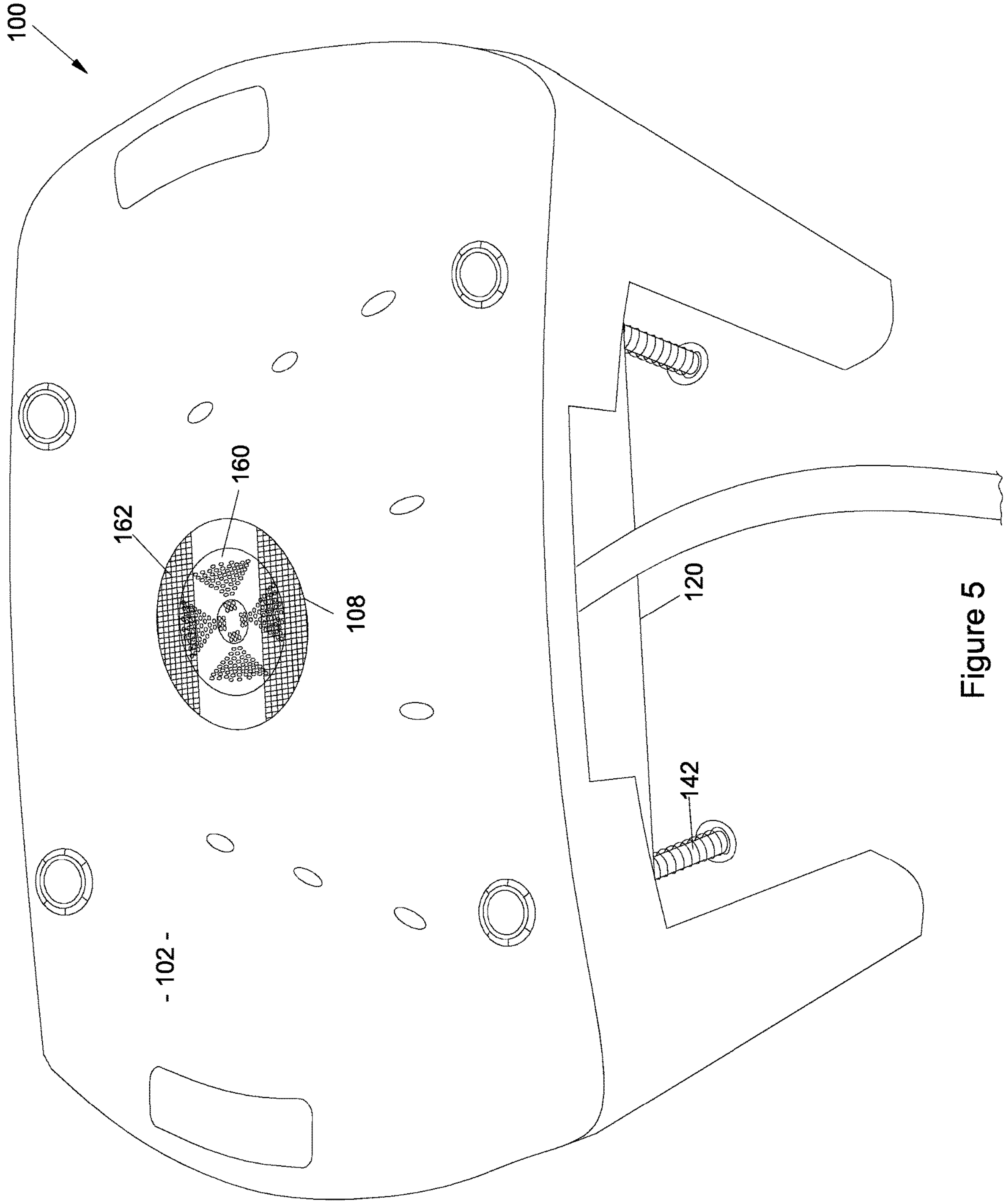
FIG. 5 is a perspective view of the bidet chair with the showerhead in position for use, in accordance with the invention.

At one side of the bidet chair 100, preferably the front for convenience, is the showerhead tray 120 and showerhead receiving notch 132. The shower head receiving notch 132 is necessary to prevent the lip 134 from contacting the shower head handle (not illustrated) or hose and thereby tilting the shower head 160 (FIG. 5).

The shower head tray 120 is moveable in a vertical direction along a support system 140 which, when at rest, maintains the shower head tray 120 spaced a predetermined distance from the seat 102 underside 136. The depth (front to back) is, for most showerheads about 3 inches, however that can vary depending on model. To accommodate depth variations, the distance between the seat 102 underside 136 and the top surface 122 of the showerhead tray 120 is adjusted automatically through the support system 140.

Whether or not a spacer will be required to space the showerhead tray 120 from the underside 136 of the seat 102 will depend on the configuration of the seat. The user must have clearance to extend their hand between the tray 120 surface 122 and the underside 136 a sufficient distance to move the showerhead tray 120 down and the showerhead inserted. In order to provide this distance spacers can be required although in many designs the construction of the under seat supports maintain the showerhead tray 120 a appropriate distance.

In one of the examples illustrated herein in FIG. 2 the support system 140 consists of support bars 142 secured to the top of the seat 102 by securing members 146. The support bars 142 carry a spring 144 having sufficient pounds of force per inch to maintain the showerhead tray 120 at a predetermined distance from the underside of the seat 102 and prevent the showerhead 160, once inserted, from separating from its position adjacent the inlet port 108. The exact pounds of force per inch is dependent on the material of manufacture of the seat 102. In a design using plastic for the tray 120, the pounds of force per inch is about six to about eight pounds. The top of the support bar 142, adjacent to the underside of the showerhead tray 120 is provided with an upper stop 148 to prevent the spring 144 from directly engaging the underside of the tray 120. Lower stop 150 maintains the spring on the support bar 142.

The springs 144 are intended to apply sufficient pressure to push the showerhead tray 120 toward the underside of the seat 102 until resistance is met, whether that resistance is the showerhead, stops, or underside of the seat 102. The pressure needs to be sufficient to maintain the showerhead 160 adjacent to the spray port 108 while the showerhead is under pressure from the water without taking a great amount of strength to move the shower tray 120 down into a position to receive the showerhead 160.

Figure 1A:
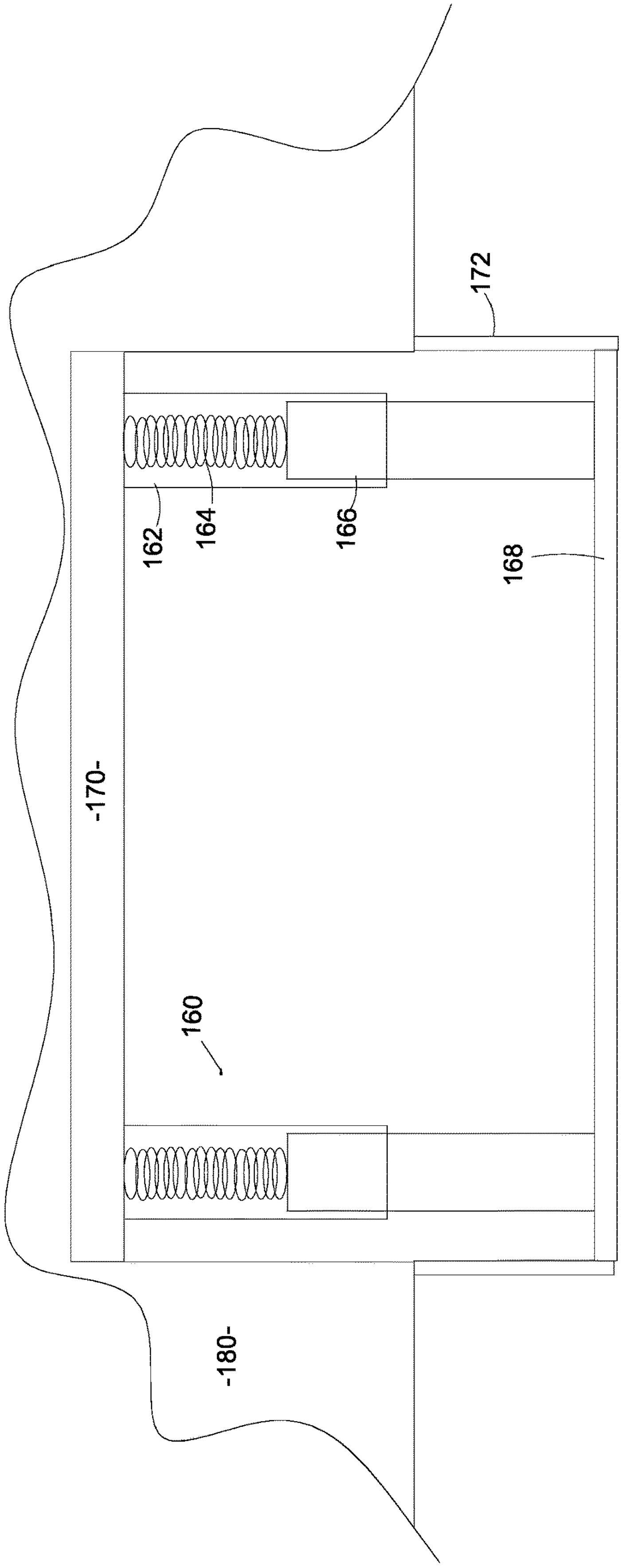
FIG. 1A is a front cutaway view of an internal spring system for use with the showerhead tray, in accordance with the invention.

In an alternate embodiment as illustrated in FIG. 1A, a telescoping system 160 is used to retain the showerhead tray 170 as well as permit the required vertical movement. Outer tubes 162, and optionally the tension springs 164, are attached to the under side of the showerhead tray 170 and prevent movement therebetween. The interior of the outer tubes 162 are dimensioned to receive the outer dimension of inner tubes 166. The bottom of the spring 164 is affixed to the top of the inner tube 166, with the bottom of the inner tube 166 affixed to the base tray 168. The tubes 162 and 166, as well as the springs 164, are attached to the base tray 168 and the showerhead tray 170 in any method applicable to the materials being used.

When the tray 170 is pressed the springs 164 compress between the tray 170 and the top of the inner tube 166. When released, the springs 164 return the tray 170 to its original position. In this example the base tray 168 is prevented from moving by connectors 172 that span the distance between base plate 168 to the body 180 of the seat. Alternatively, the inner tubes 166 and connectors 172 can have a length sufficient to place the base tray 168 on the shower floor. A single base tray 168 can be used for all four tubes or two base plates can be used to connect pairs of tubes. If two base plates are used, each pair will need to be connected to the body. These are two examples of methods of connecting the telescoping system 160 to the body 180 and other methods will be known to those skilled in the art.

The final determination of the pounds of force per inch will be determined by the materials of manufacture. The greater the weight of the showerhead tray 120 in combination with the weight of the showerhead, the greater the force required to be exerted by the springs.

Figure 3:
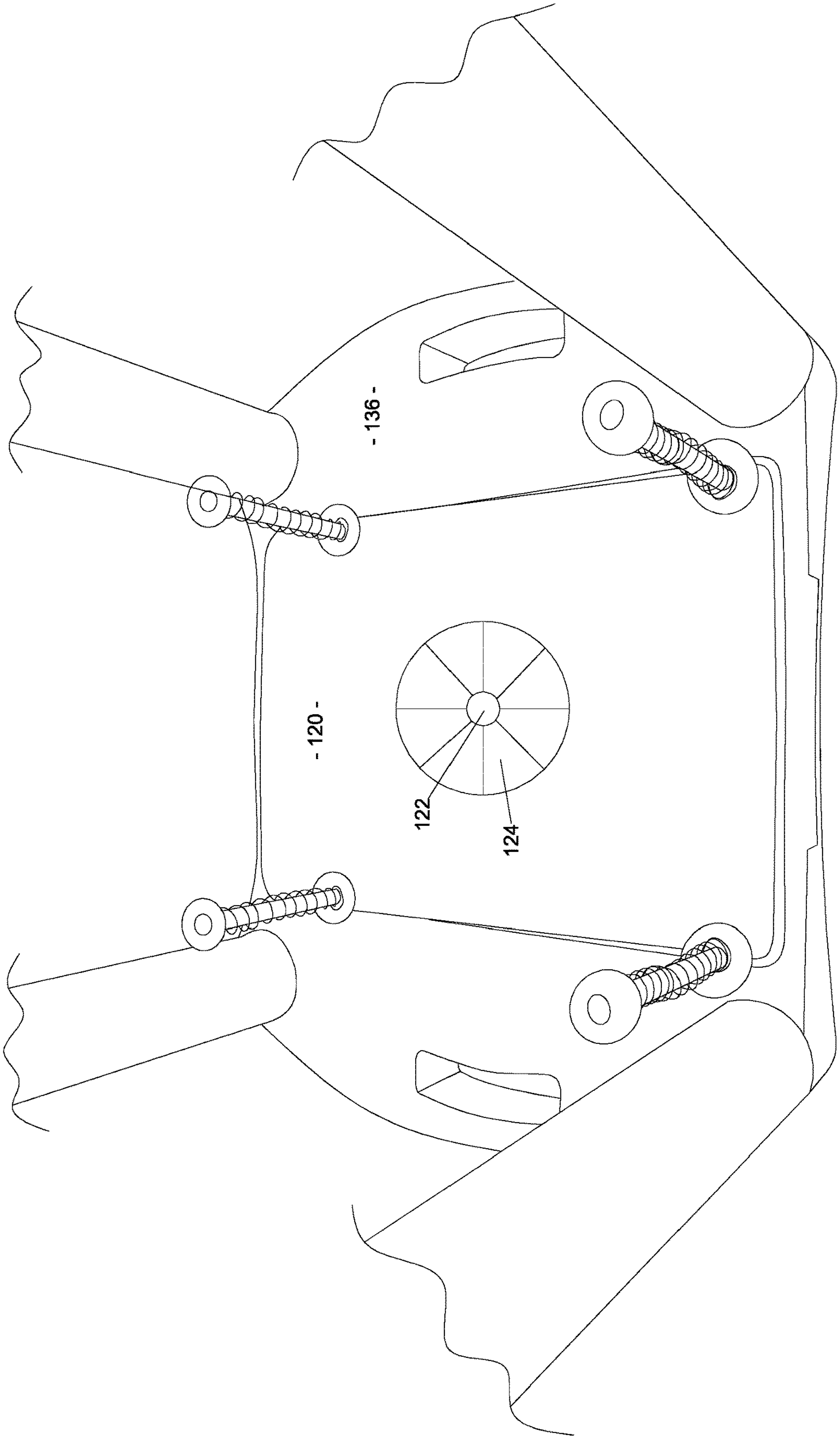
FIG. 3 is a perspective view of the underside of the bidet chair of FIG. 1, in accordance with the invention.

FIG. 3 illustrates the underside of the bidet chair 100 of FIGS. 1 and 2. Preferably the shower head tray 120 contains cutout 122 and deformable area 124 to receive the back of the showerhead. The use of a cutout 122 and deformable area 124 enables a wider variety of showerhead designs to be used while preventing rocking. The cutout 122 further serves to drain excess water from the tray 120 as well as making it easy for the user to position the showerhead. Since the deformable area 124 leads toward the cutout 122, the user can easily position the showerhead to align with the spray port 108. Other methods of preventing the showerhead from becoming misaligned, such as an insert as described in conjunction with FIG. 12, elastic mesh, or depressed area, can be used and will be dependent upon the material and method of manufacture.

Figure 4:
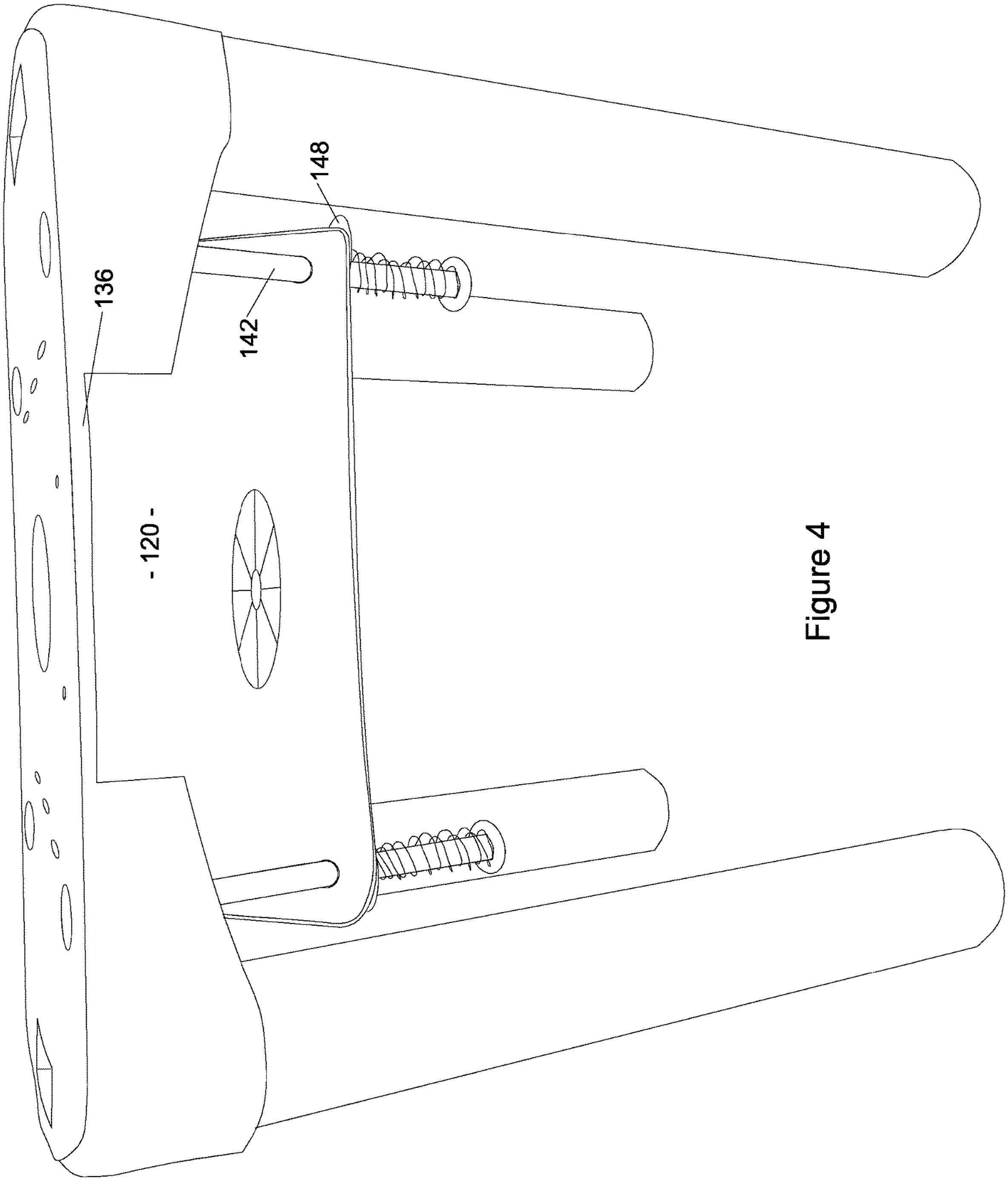
FIG. 4 is a perspective view of the bidet chair with the showerhead tray pulled down to receive the showerhead, in accordance with the invention.

In FIG. 4 the showerhead tray 120 has been pressed down to receive the showerhead. As can be easily seen in this Figure, the support bars 142 are greater than the distance required to insert a showerhead in order to provide space for the compressed springs 144. For example, to provide clearance for the insertion of a showerhead having a depth of three (3) to four (4) inches along with the space to easily insert the showerhead, a travel distance of six (6) to eight (8) in addition to two (2) to three (3) compression space for the springs would require a support bar 142 of eight (8) to (11) inches. Once released, the springs 144 return the showerhead tray 120 to a position that forces the showerhead against the underside 136 of the seat 102.

In order to facilitate access to the showerhead tray 120 and provide space for the showerhead 160 hose and the handle of the showerhead 160, the edge of the seat 102 is provided with a notch 138. The width and depth of the notch 138 can vary depending on end user and the distance of the showerhead tray 120 from the underside 136 of the seat 102 when at rest. The intent is for the user to easily grasp and move the showerhead tray 120 in a downward motion as well as prevent the showerhead 160 hose and handle from contacting the underside 136 of the seat 102.

In FIG. 5 the showerhead 160 has been placed on the tray 120 and the tray 120 permitted to rise along the support bars 142 to secure the showerhead 160 in place. Screens 162 are affixed to the underside 136 of the seat 102 to prevent the showerhead 160 from passing through the spray port 108 as well as assist with maintaining the alignment. The screens 162 are not necessary for all size showerheads 160 and can be excluded if the user consistently uses the bidet chair 100 with the same showerhead 160 that has a diameter greater than the spray port 108.

Figure 6:
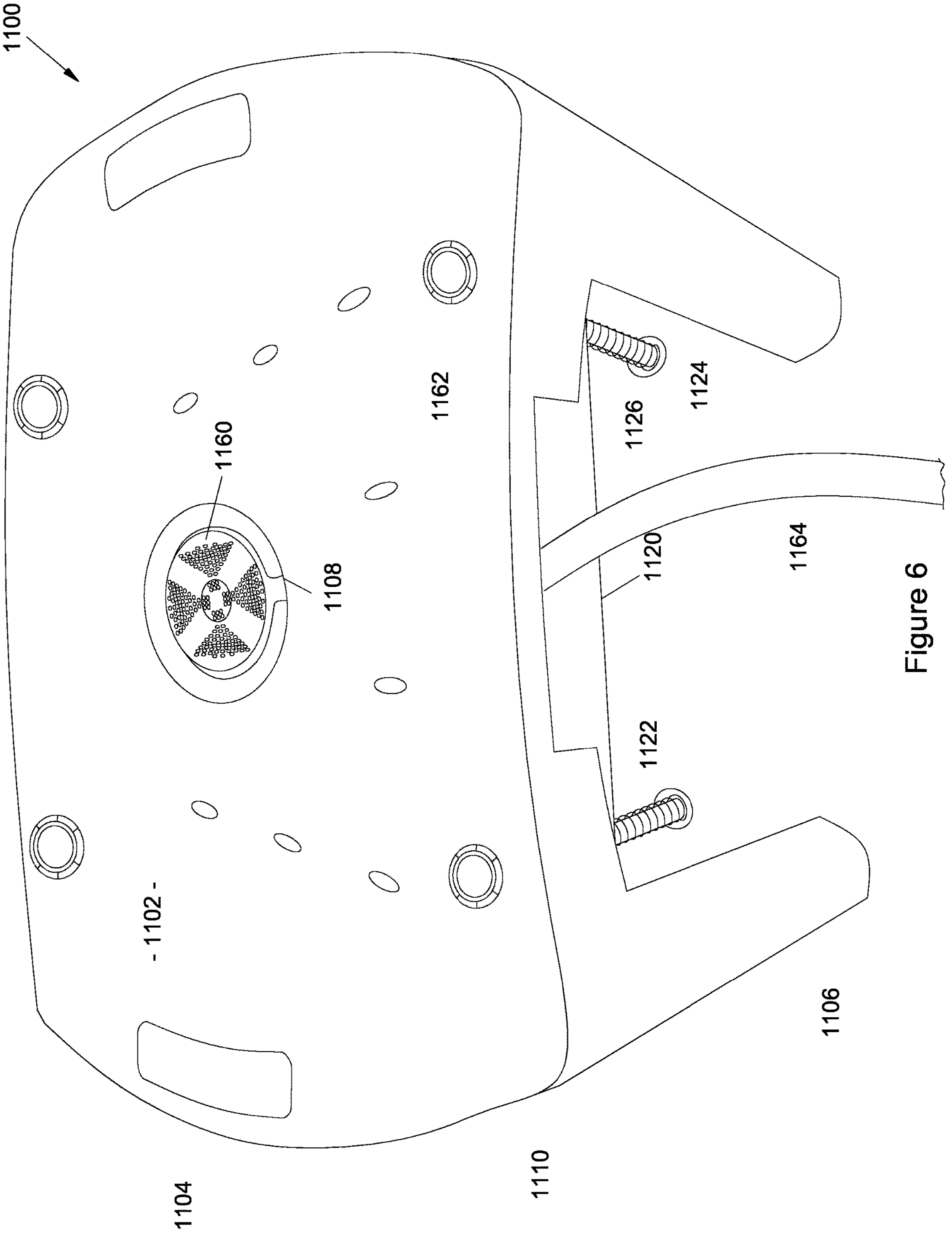
FIG. 6 is a perspective view of an alternate embodiment of the shower bidet chair with the showerhead being retained by rails, in accordance with the invention.
Figure 7:
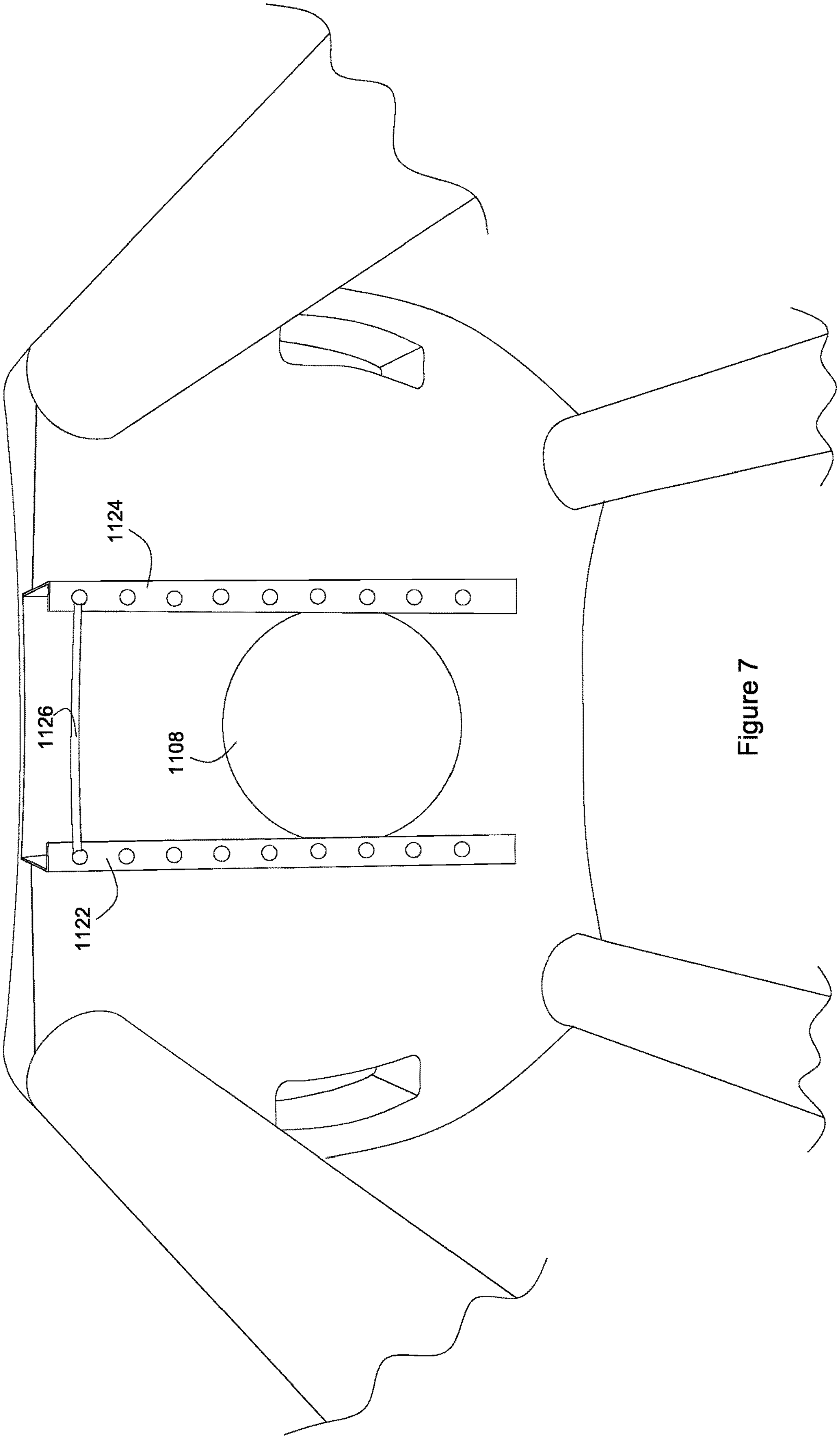
FIG. 7 is a perspective view of the underside of the bidet chair of FIG. 6 without the shower head inserted and clearly illustrating the rails, in accordance with the invention.
Figure 8:
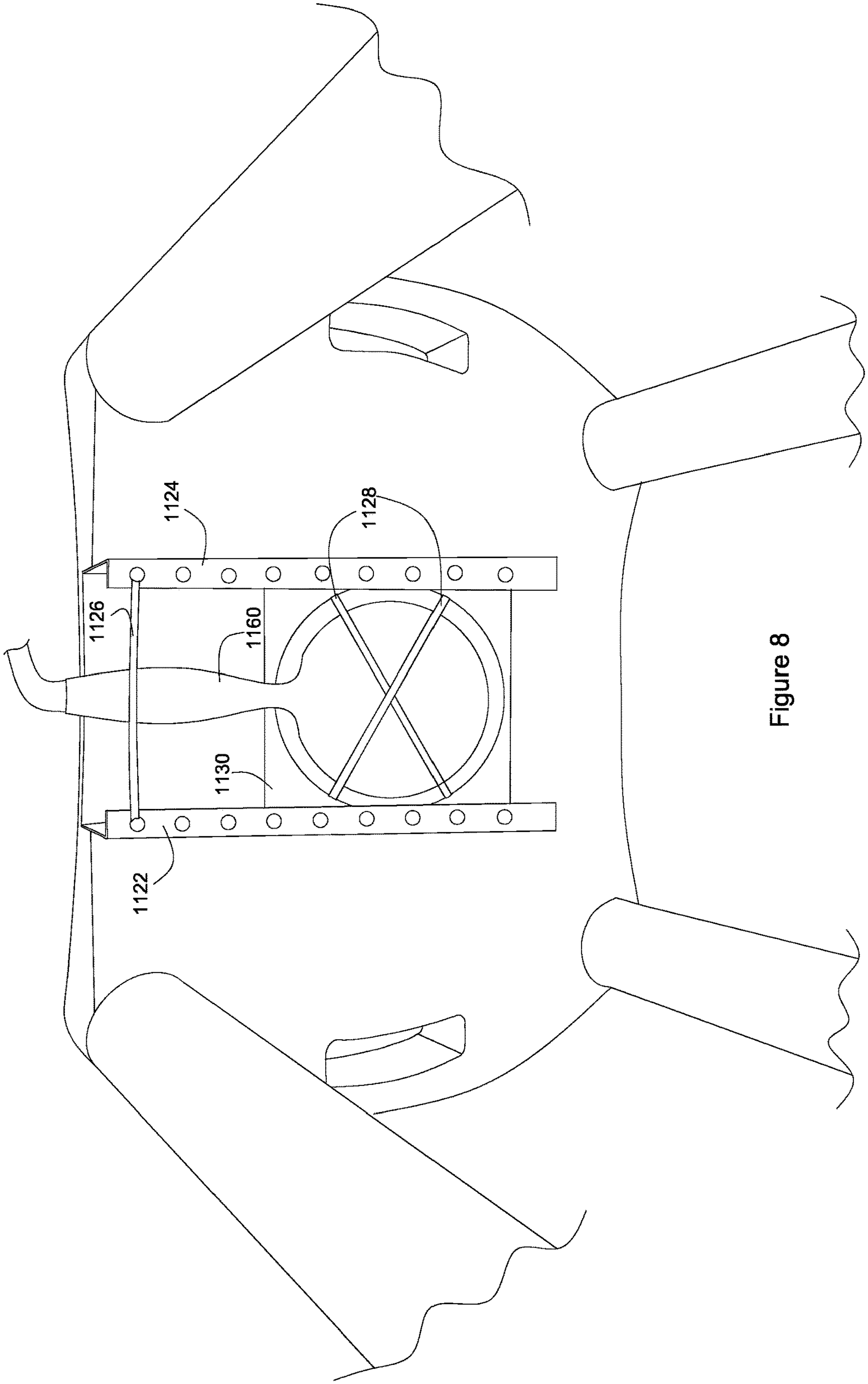
FIG. 8 is a perspective view of the underside of the bench seat of FIG. 6 with the shower head inserted, in accordance with the invention.

In FIG. 6 the bidet chair 1100, an alternate embodiment to the bidet chair 100 of FIG. 1, is illustrated. As with the bidet chair 100, this embodiment contains the drain holes 1110 within the seat 1102, handles 1104 and spray port 1108. In this embodiment however the showerhead 1160 is positioned, and retained, by channel rails 1122 and 1124. The channel entrance 1120 is dimensioned to receive the showerhead support element 1130 as illustrated in FIGS. 7 and 8 and described hereinafter.

To prevent the shower head from tipping due to the weight of the showerhead handle 1162 and shower flex hose 1164, a handle support 1126 spans the gap between the channel rail 1122 and channel rail 1124. The support 1126 can be flexible or rigid, however it must not interfere with the insertion or removal of the support element 1130. The support 1126 is placed either flush with the ends of the channel rails 1122 and 1124 or on the bottom of the rails 1122 and 1124. This configuration allows the support element 1130 to slide along the top surface of the channel rails 1122 and 1124 without interference from support 1126.

In this figure the showerhead 1160 and spray port 1108 are clearly seen and illustrate some spacing between the showerhead 1160 and spray port 1108, however this can be reduced, eliminated, or increased. If the area between the showerhead 1160 and spray port 1108 is to be used for drainage, the space would be greater than if drain holes 1110 were provided. The area should not be so great as to permit possible pinching or catching of the user's skin.

It can also be seen in this figure that the showerhead 1160 is on the same plane as the bottom of the seat 1102, therefore causing all water to spray upward. This is, as stated heretofore, enabled by the weight of the flex hose 1164 being supported by the support 1126.

In FIG. 7 the showerhead 1160 has been removed and the channel rails 1122 and 1124 and the support 1126 can be clearly seen. The channel rails 1122 and 1124 are also shown as extending beyond the spray port 1108. The channel rail 1122 and channel rail 1124 must extend a sufficient distance under the spray port 1108 to retain the support element 1130. In most embodiments the extension will be beyond the spray port 1108, however if necessary, it is possible to have the support element 1130 extend beyond the channel rail 1122 and channel rail 1124 as long as the dimensioning is sufficient to maintain the support element 1130 in place while under pressure from the water. When the support from the channel rails 1122 and 1124 does not extend to incorporate the entire length of the support element 1130, the handle support 1126 would be taking additional weight and should be designed accordingly.

In FIG. 8 the showerhead 1160 has been placed in the support element 1130 having been slid along the channel rails 1122 and 1124 into place. The showerhead 1160 is maintained within the support element 1130 by retaining bands 1128. As illustrated herein, the retaining bands 1128 are flexible members that have sufficient flex to enable the showerhead 1160 to be easily placed within the support element 1130. As the support element 1130 need not be removed from the flex hose 1164, and can be left to slide along the showerhead hose, it is preferable that the retaining bands 1128 be flexible to enable easy mounting and dismounting from the support element 1130. Alternatively, the retaining bands can be secured at one end with the other being removably affixed to the support element to enable the bands to be opened at one end for mounting and dismounting the shower head. This embodiment is less convenient; however, this and other designs of mounting and dismounting the shower head can be incorporated.

Figure 10:
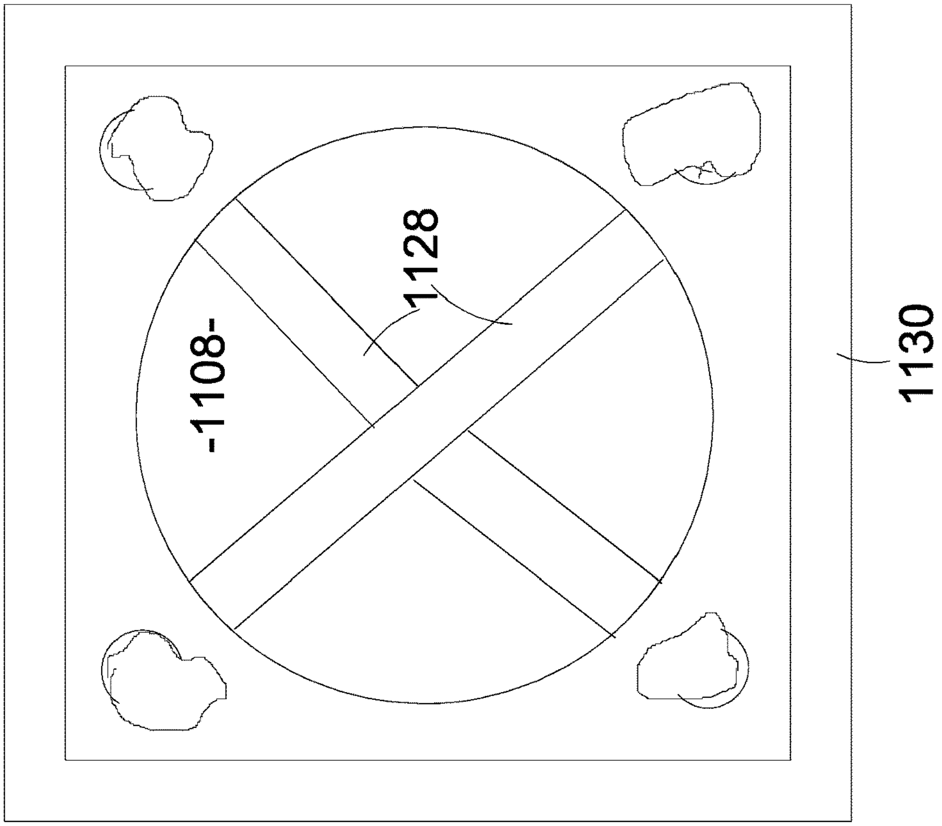
FIG. 10 is a view of the shower head retaining element contain the flexible supports for retention of the showerhead, in accordance with the invention.
Figure 9:
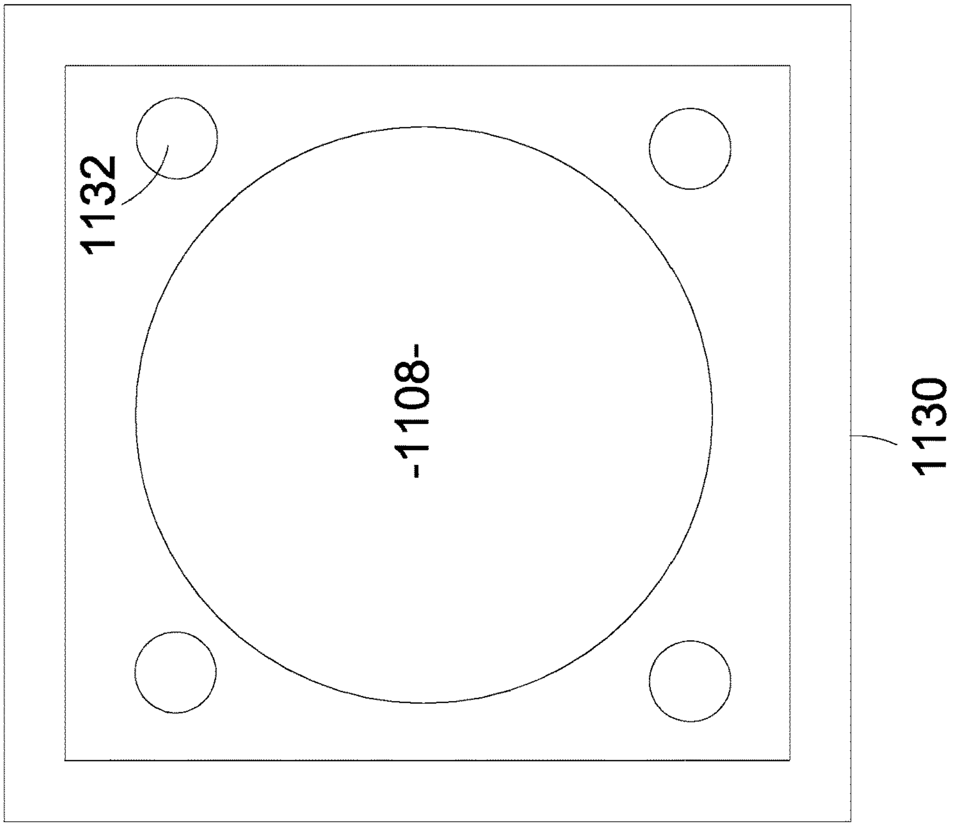
FIG. 9 is a top view of the showerhead retaining element, in accordance with the invention.

FIGS. 9 and 10 illustrate one example of a support element 1130 with and without the retaining bands 1128. As stated heretofore, the retaining bands 1128 are placed to maintain the shower head 1160 (not illustrated) within the spray port 1108. The illustrated support element 1130 uses retaining bands 1128 threaded through the receiving holes 1132 and secured in any manner convenient. This is an easy and adjustable manner of maintaining the retaining bands 1128 in place though other methods can be used.

Figure 11:
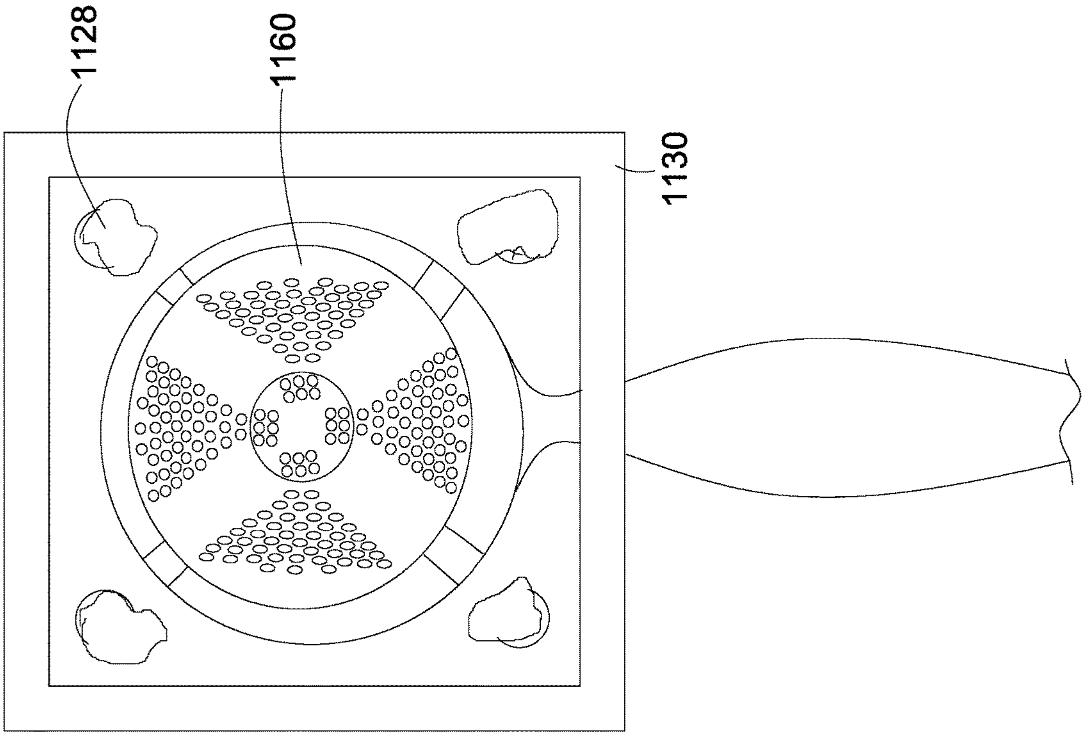
FIG. 11 is a view of the showerhead retaining element with the showerhead inserted, in accordance with the invention.

FIG. 11 shows the shower head 1160 placed in the support element 1130 and retained in position by the retaining bands 1128.

Figure 12:
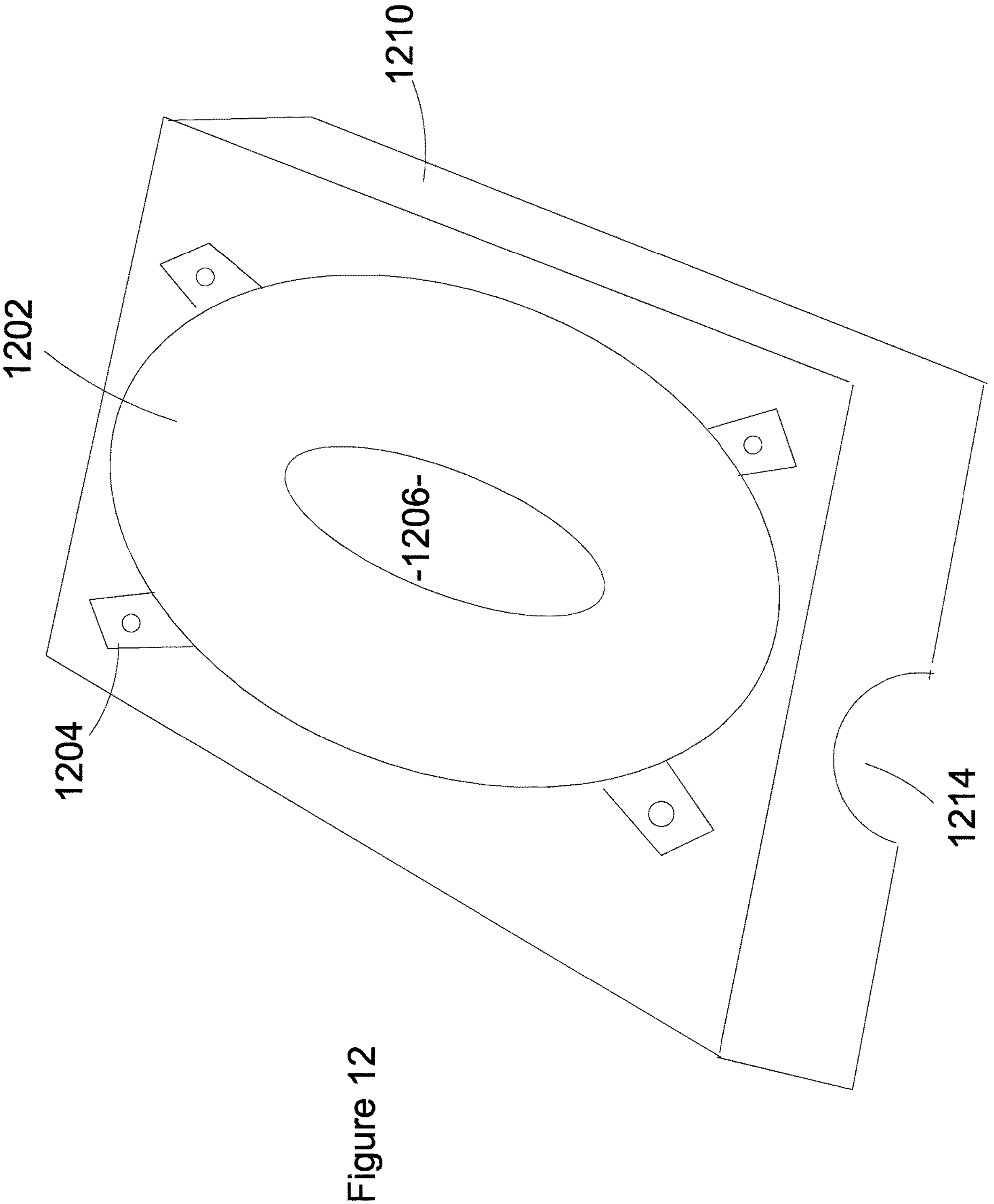
FIG. 12 is a perspective view of a flexible insert for a showerhead retaining element, in accordance with the invention.

In an alternative embodiment, illustrated in FIG. 12, retaining bands 1128 as described heretofore are not used; instead, a flexible insert 1202 is secured to the support element 1210 through the use of tabs 1204. The flexible insert 1202, such as natural latex or its equivalent, is provided with a receiving port 1206 that is dimensioned to receive a shower head (not shown). The flexibility and memory of the insert 1202 permits a shower head to be inserted through the receiving port 1206, returning to its original size once pressure is released. The handle of the showerhead is received in the notch 1214 thereby preventing the showerhead from tilting. It is preferable that the flexible insert 1202 be manufactured from a material that permits expansion about 200% without damage. When using latex, the material would generally be in the range of 0.33 mm to about 0.65 mm. Thicker latex, 1 mm and above takes a substantial amount of force to stretch and will only stretch up to about 80% prior to damage.

Although the embodiment illustrated in FIG. 12 is using tabs 1204 to secure the flexible insert 1202 to the support element 1210, this is for example only. Additional tabs, or a full or partial rim surrounding all or a portion of the periphery, can also be used.

Figure 13:
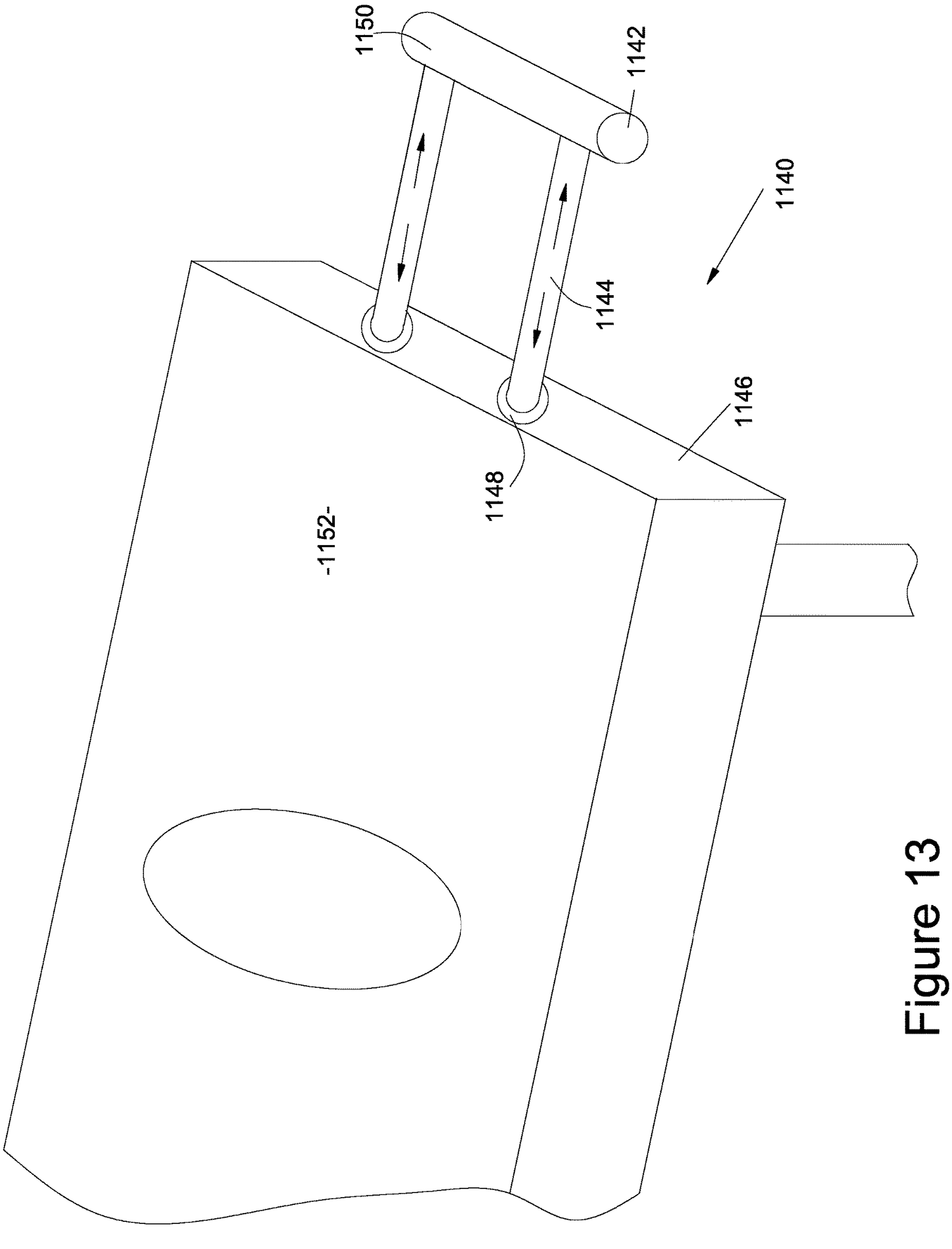
FIG. 13 is a top view of adjustable handles for use with the seat of the bidet chair, in accordance with the invention.

In the embodiment illustrated in FIG. 13, adjustable handles 1142 are slidably connected to opposing sides 1146 of the seat 1140 by handle legs 1144. The handles 1142 can be brought adjacent to the sides 1146 to be out of the way or extended to assist in standing. The handle legs 1144 can be supported under the seat 1140 through the use of brackets or molded channels. The handle top 1150 can range from slightly lower to higher than the seating surface 152 depending on preference.

In embodiments where the handle top 1150 is higher than the seating surface 1152, the handles 1142 can be moved away from the sides 1146 to accommodate larger frames. This would be unnecessary when the handle top 1150 is below the seating surface 1152. The handle top 1150 further aids in assisting in people to stand by providing a secure grip.

Figure 14:
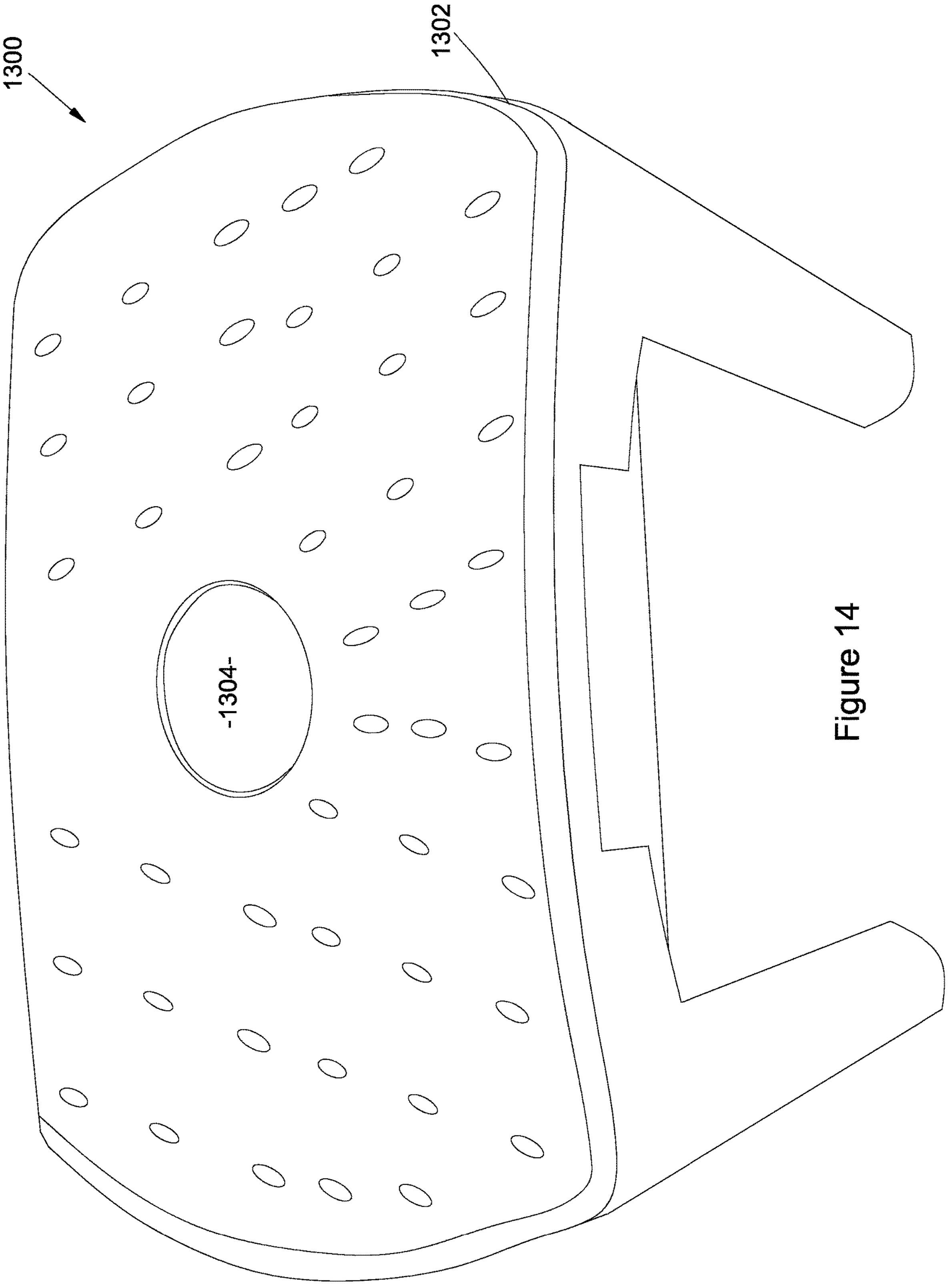
FIG. 14 is a perspective view of a topper designed for use with the bidet chair having an water inlet port and drain holes, in accordance with the invention.

FIG. 14 illustrates a cushion 1300 dimensioned to fit over the seat 102, 1102 of bidet chair 100, 1000. The cushion 1300 is of any appropriate material that provides cushioning and is quick drying to avoid mold. To facilitate drainage the holes 1302 are aligned with the drain holes in any of the disclosed embodiments. The water port 1304 is cut to align with the spray port 1108. The thickness of the cushion 1300 is dependent upon the material of manufacture and will be known to those skilled in the art.

Figure 16:
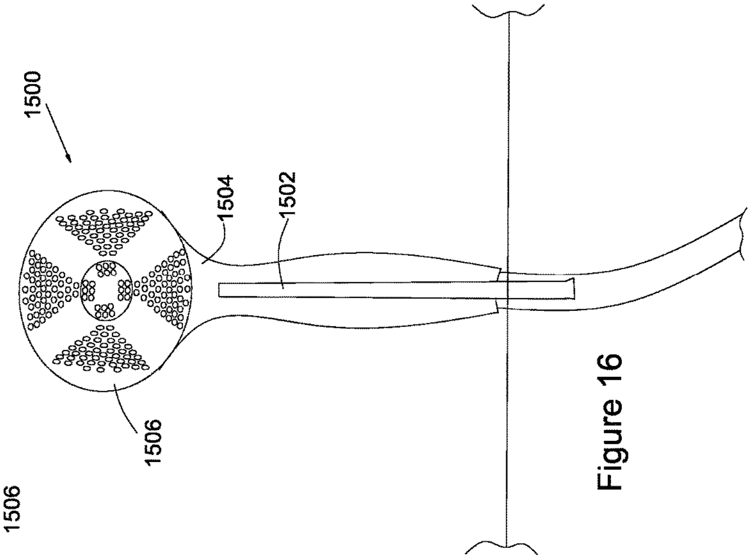
FIG. 16 is a front view of the showerhead of FIG. 17, in accordance with the invention.
Figure 15:
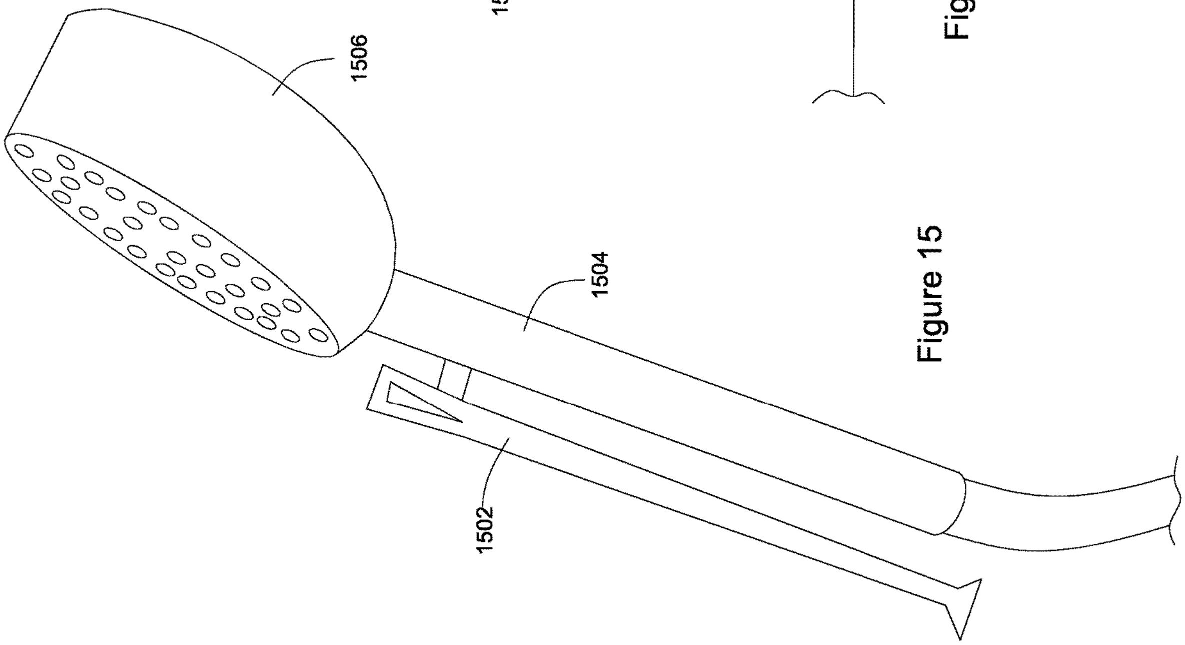
FIG. 15 is a perspective view of a showerhead having pressure adjustment, in accordance with the invention.
Figure 17:
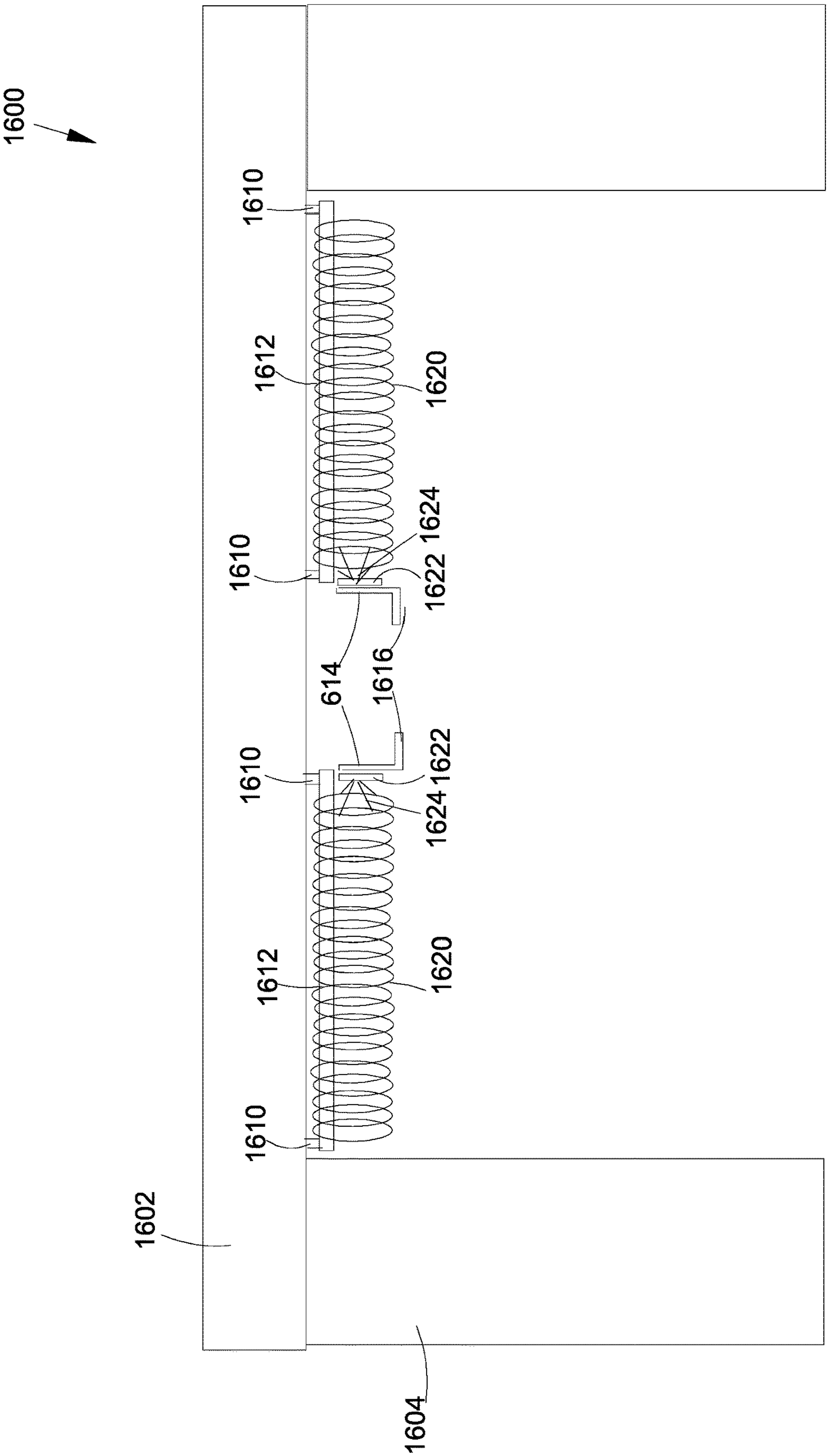
FIG. 17 is a front view of the bench seat with a universal shower head receiving area in accordance with the invention.
Figure 18:
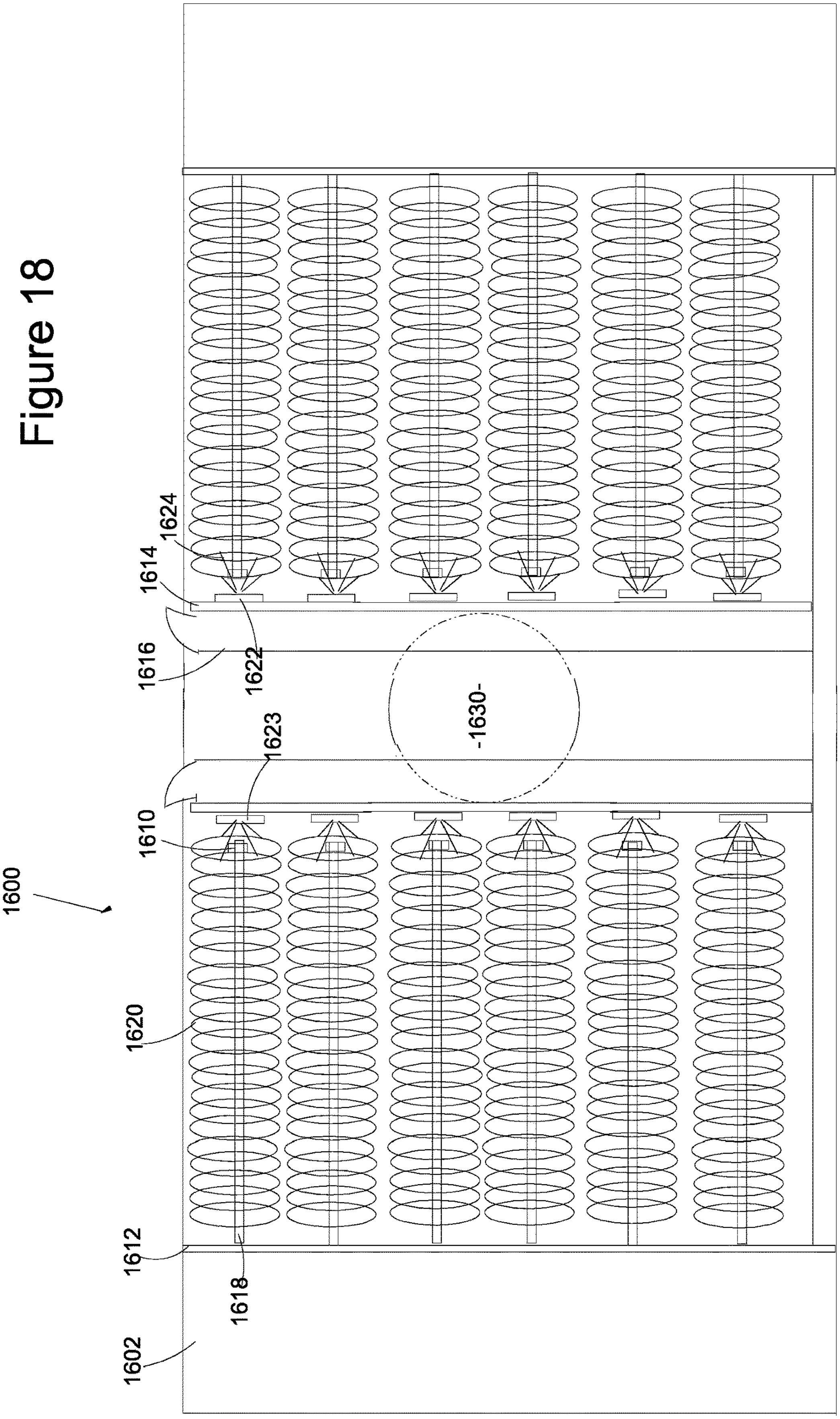
FIG. 18 is a bottom view of the universal shower head receiving area of FIG. 17 in accordance with the invention.
Figure 19:
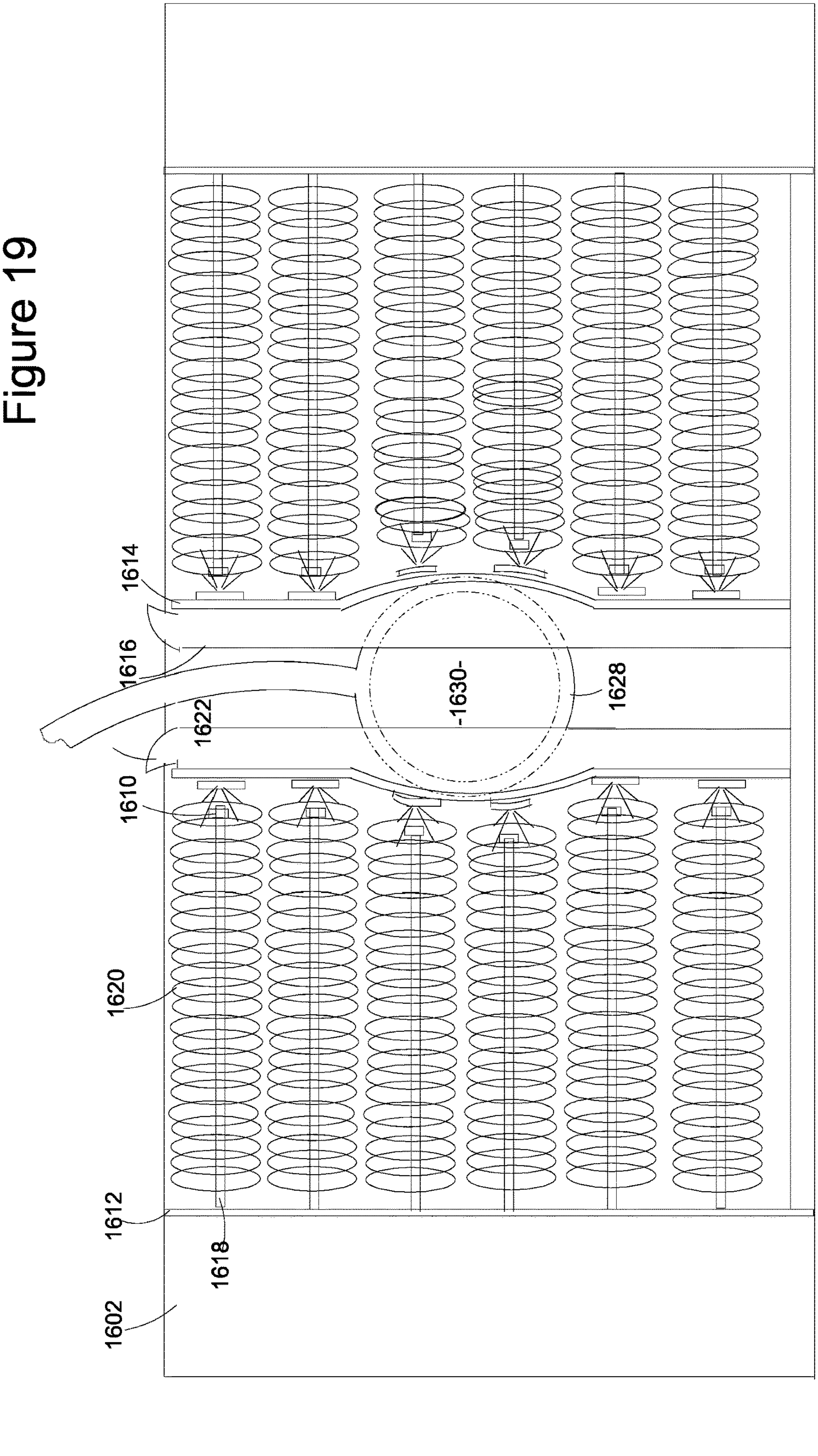
FIG. 19 is a cutaway top view of the universal shower head receiving area of FIG. 18 with a shower head inserted in accordance with the invention.

FIGS. 15 and 16 illustrate a shower head 1500 that uses a lever 1502 to control the water pressure emitting from the shower head face 1506. The lever 1502 extends beyond the edge 1510 of the seat 102 as shown in FIG. 17 to enable the user to control the water pressure while the shower head 500 is in position.

FIGS. 17-21 illustrate an alternate universal shower head holder for use in the bidet chair 1600. The springs 1620, which run on the spring rails 1618 are what permit the flex tracks 1614 and trays 1616 to move out of the way of the shower head during placement and then return to position. The flex tracks 1614 and trays 1616 are positioned on either side, the spray port 1630 on the underside of the seat 1602. The exact distance between the two trays 1616 is not critical as long as the positioning is such that they can receive the shower head. The springs 1620 are supported by, and free to move on, spring rail 1618 which is connected at a distal end to a support rail 1612 and a support bracket 1610 at the proximal end.

The support rail 1612, as illustrated herein, runs from front to back of the seat 1602 which is provided with brackets 1610 or other receiving areas for the support rail 1612. The receiving areas can be brackets, half cups, or holes and will be known to those skilled in the art. In addition to providing a connection point for the spring rails 1618 the support rail 1612 can provide additional structural strength to the bidet chair 1600. In some applications it can be more applicable to use brackets to secure the distal end of the support rail 1618 to the bottom of the seat 1602 or, in small versions, secure the distal end of the support rail 1618 directly to the outside ledge of the seat 1602. At the distal end the support rail 1618 is secured to the underside of the seat 1602 by a support bracket 610 as seen in more detail in FIG. 18.

The distal end of the spring 1620 is secured by the pivot head connectors 1624, to a pivot unit 1622. The pivot head 1623, which is in turn securely secured to the flex track 614, permits a wider range of movement than would be via wire or other methods. The pivot head 623 is manufactured from a semi-rigid material to permit it to flex along with the flex track 614.

Figure 20:
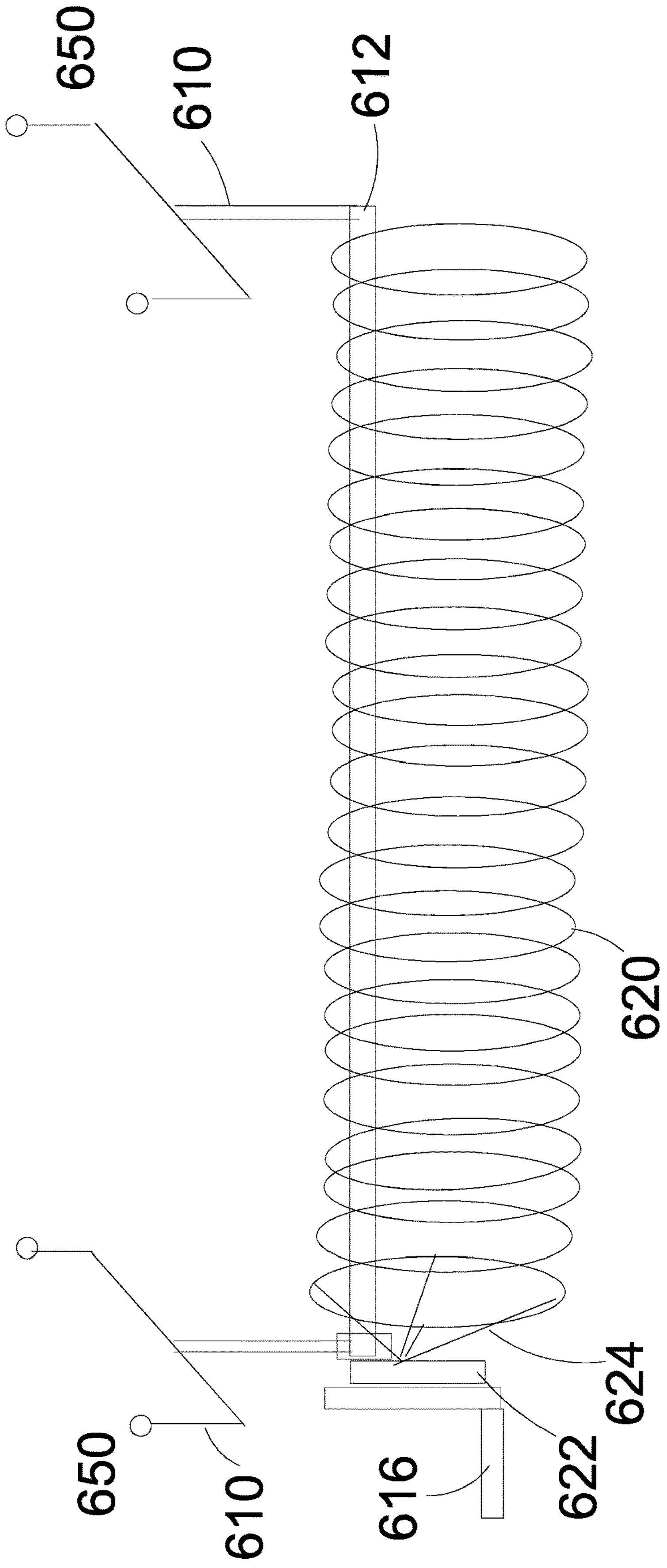
FIG. 20 is a front view of a spring/rail arrangement as used in FIGS. 17-19, in accordance with the invention.
Figure 21:
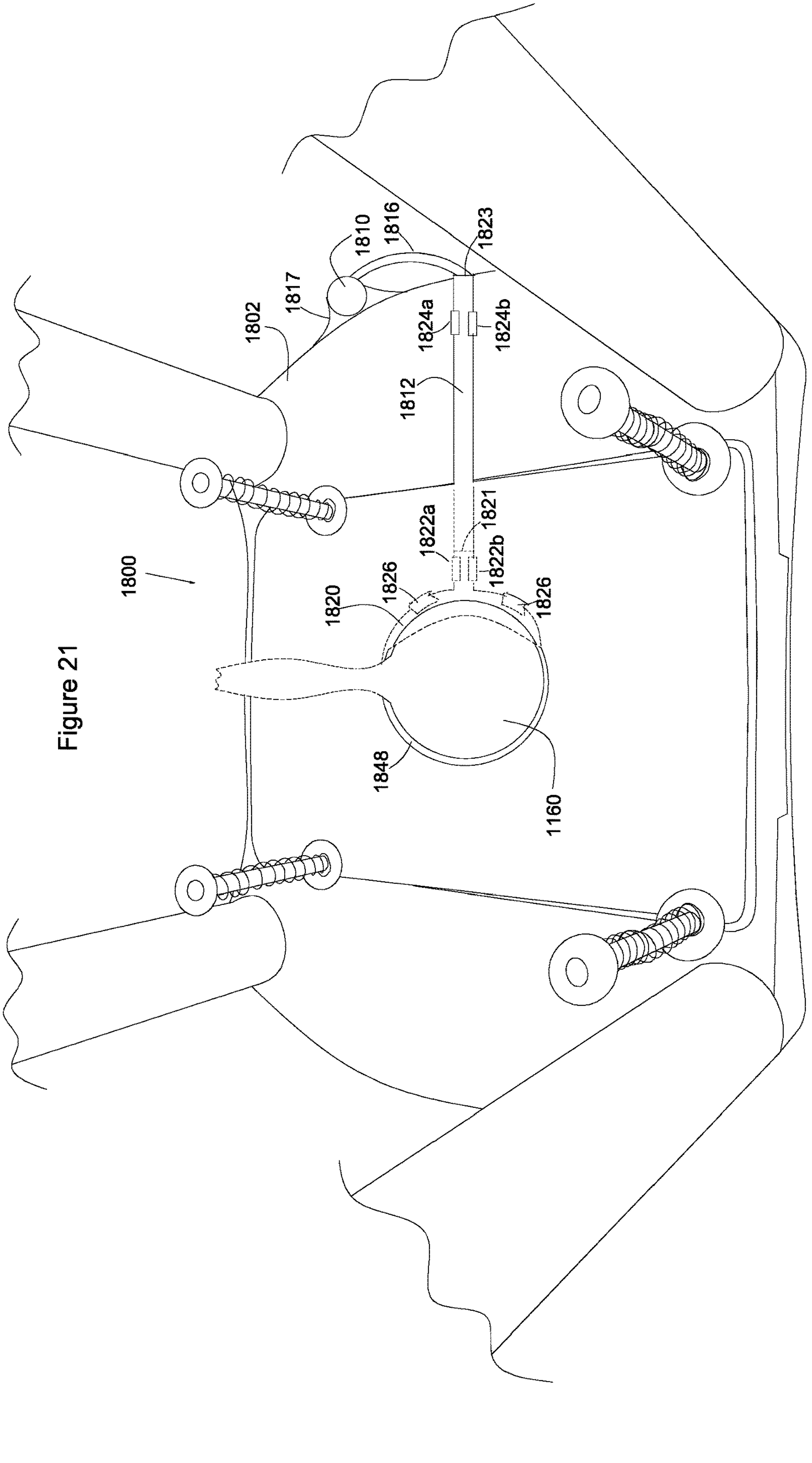
FIG. 21 is a bottom view of the disclosed bidet chair seat with an example of a soap dispensing system, in accordance with the invention.

In FIG. 20 the shower head 1628 is in place under the spray port 1630 showing how the flex rail 1614 and tray 1616 flex to receive and retain the shower head 1628. As the shower head 1628 is moved along the flexible rail 1614 and tray 1616, the springs 1620 compress along the spring rail 1618 affixed to the support rail 1612. Any non-lateral movement of the flexible rail 1614 is absorbed by the pivot brackets 1610. Additionally, as the pivot brackets 1610 are manufactured from a material having equal or greater flexibility than the flexible rail 1614, they are able to flex along with the flexible rail 1614 to maintain, through pressure of the springs 1620, contact with the flexible rail 1614.

The connection between the pivot unit 1622, pivot head connectors 1624 and flex track 1614 is more clearly illustrated in FIG. 20. As illustrated in prior figures, the flex track 1614 and tray 1616 are secured to the underside of the seat 1602. As clearly illustrated in this angle, the springs 620 freely ride on the support rail 1612 to enable compression by the flex track 1614 and tray 1616. The pivot head and flex rail 1614 must both be below the bottom of the support rail 612 to permit compression. If the pivot head and flex rail 1614 are equal to, or higher than, the support rail 1612 compression will be prevented or the flex rail 1614 will extend out at an angle and damage the system. To prevent the tray 1616 from flexing downward, the vertex of the L, or connection point between the tray 1616 and flexible rail 1614 can be thicker than the legs of the L.

In this figure the support bracket 1610 is illustrated as attached to the underside of the bidet chair seat 1602 by U-brackets1 650, which are secured by means appropriate to the materials being used, including but not limited to rivets, adhesives, or recessed bolts. This is one method of attachment and other methods will be known in the art.

In the embodiment illustrated in FIGS. 21-24 a soap container 1810 is placed on the side of the seat 1802 of the bidet chair 1800. In this embodiment the soap container 1810 can be for soap or other liquid or semi-liquid materials. One or more brackets can also be provided along the sides of the seat 1802, or legs, with different dimensions, for example holders for brushes, sponges, cloths, supplies, etc. Leading from the soap container 1810 is a transfer hose 1816 leading to dispensing hose 1812 that in turn leads to soap dispenser collar 1820.

Figure 22:
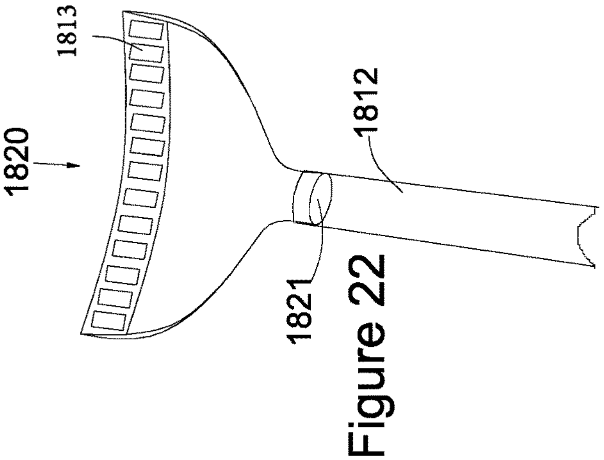
FIG. 22 is a front view of the soap dispenser for use with the bidet chair, in accordance with the invention.

FIG. 22 illustrates the soap dispenser collar 1820 that is placed within the spray outlet 1808. The dispenser collar has outlets 1822 to dispense the soap along the edge of the spray outlet 1808.

Figure 23:
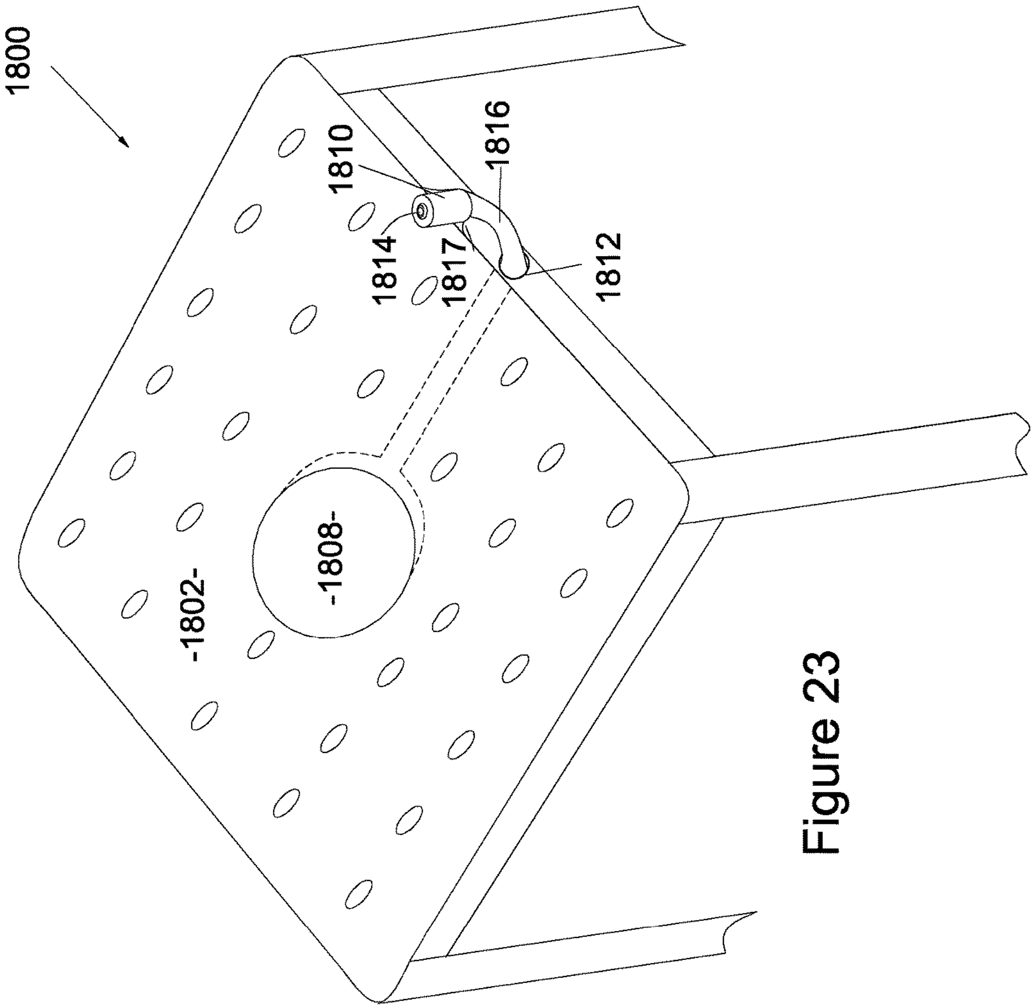
FIG. 23 is a perspective of the example soap dispensing system of FIG. 22 showing the connecting tubes, in accordance with the invention.

As shown in FIG. 23, the soap dispenser collar 1820 as well as the transfer hose 1816 and dispensing hose 1812 are preferably removably affixed to the bottom of the seat 102. Removability is advantageous in order to clean the soap from the various system elements. The removability can be accomplished by providing clips, loops or other methods to affix the elements.

Figure 24:
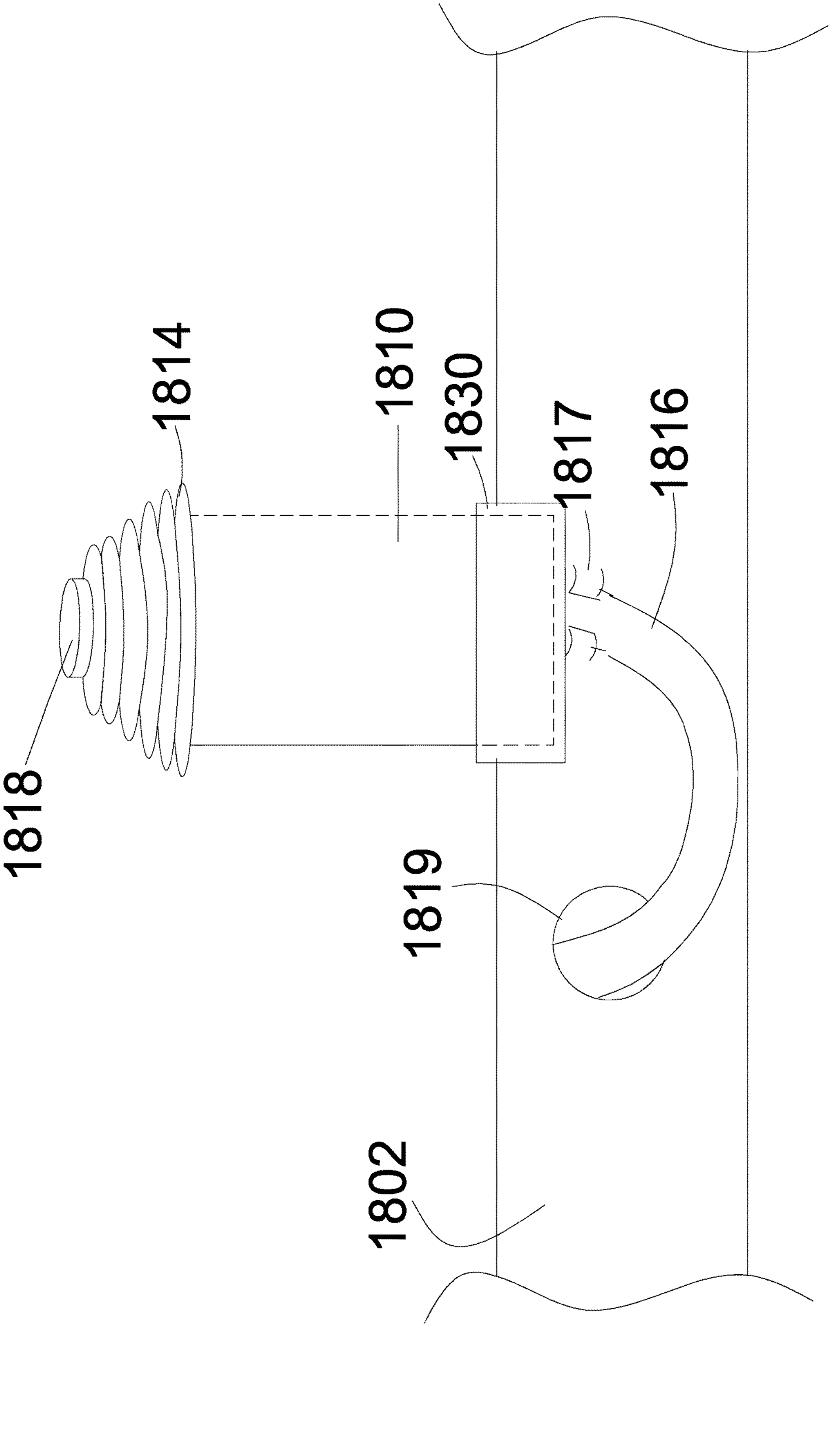
FIG. 24 is a side view of an example soap canister for use with the soap dispensing system of FIG. 22, in accordance with the invention.

In the preferred embodiment, which can be seen in more detail in FIG. 24, the soap container 1810 has a pump top 1814 that is pressed to force the soap to the transfer hose 1816 and along to the dispensing hose 1812 and into the dispenser collar 1820 and out the outlets 1822. The dispensing container 1810, as illustrated, has a filler cap 1818 on the top of the pump top 1814.

In this embodiment the side of the seat 1802 must be modified to provide an entrance port 1819 through which the dispensing hose 1812 or transfer hose 1816. The soap container illustrated herein is an example of one method of transferring the soap. Other designs for the dispenser collar 1820 can be incorporated and the collar can be removable if desired.

All embodiments should be manufactured from a light weight material sufficient to hold several hundred pounds. All embodiments have, unless noted otherwise, slip resistant, non-marring feet. Additionally, whether the seat has a back or not does not affect the design of the bidet chair portion.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language of the present invention or inventions should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A bidet chair for use in cleaning the body comprising:
a chair comprising:
legs, and
a seat comprising:
a top side,
an underside;
a spray port extending from the top side to the underside;
showerhead receiving rails extending from a front of the bidet chair along the underside past the spray port and dimensioned to receive a showerhead receiving member and maintain a showerhead proximate said spray port;
wherein, the showerhead receiving member has a deformable area within a frame dimensioned to be slidably received within the showerhead receiving rails; and
wherein, a showerhead is placed on the showerhead receiving member and slid along the showerhead receiving rails to position the showerhead under and proximate the spray port.

2. The bidet chair of claim 1 further comprising drain holes positioned within the seat and extending from the top side to the underside.

3. The bidet chair of claim 1 wherein the deformable area deforms under pressure from said showerhead.

4. The bidet chair of claim 1 wherein the seat further comprises a notch along the front to enable access to the showerhead tray.

5. The bidet chair of claim 1 further comprising handles.

6. The bidet chair of claim 5 wherein the handles extend at an angle from the top side of the seat.

7. The bidet chair of claim 5 wherein the handles are slidable within sides of the seat.

8. The bidet chair of claim 5 wherein the handles are cutouts extending from the top side to the underside of said seat.

9. The bidet chair of claim 1 further comprising at least one screen covering the spray port.

10. The bidet chair of claim 1 further comprising a cover for the seat, the cover having holes positioned over the seat drain holes.

11. The bidet chair of claim 1 further comprising a cover having an opening above the spray inlet.

12. A bidet chair for use in cleaning the body comprising:
a chair comprising:
legs, and
a seat comprising:
a top side,
an underside;
drain holes positioned within the seat and extending from the top side to the underside;
a spray port extending from the top side to the underside;
a screen covering the spray port;
a notch along a side of said seat;
at least one handle;
showerhead receiving rails extending from said notch along the underside past the spray port and dimensioned to receive a showerhead receiving member and maintain a showerhead proximate said spray port; and
a showerhead receiving member having a deformable area within a frame dimensioned to be slidably received within the showerhead receiving rails, the deformable area deforming under pressure from said showerhead;
wherein the showerhead is placed on the showerhead receiving member and slid along the showerhead receiving rails to position the showerhead under and proximate the spray port.

13. The bidet chair of claim 12 wherein said handles extend from said top side of said seat.

14. The bidet chair of claim 12 wherein said handles are slidable within sides of said seat.

15. The bidet chair of claim 12 wherein said handles are cutouts extending from said top side to said underside of said seat.

16. The bidet chair of claim 12 further comprising a cover for the seat, the cover having holes positioned over the seat drain holes and spray inlet.

* * * * *